US00RE35341E

United States Patent [19]

Kikuchi et al.

[11] E Patent Number: Re. 35,341

[45] Reissued Date of Patent: Oct. 1, 1996

[54] SHEET FEED APPARATUS FOR IMAGE FORMING SYSTEM

[75] Inventors: Yutaka Kikuchi; Seiji Sagara, both of Kawasaki, Japan

[73] Assignee: Canon Kabushiki Kaisha, Tokyo, Japan

[21] Appl. No.: 36,808

[22] Filed: Mar. 25, 1993

Related U.S. Patent Documents

Reissue of:

[64] Patent No.: 5,002,266
Issued: Mar. 26, 1991
Appl. No.: 288,143
Filed: Dec. 22, 1988

[30] Foreign Application Priority Data

| | | | |
|---|---|---|---|
| Dec. 26, 1987 | [JP] | Japan | 62-331141 |
| Dec. 26, 1987 | [JP] | Japan | 62-331142 |
| Dec. 26, 1987 | [JP] | Japan | 62-331144 |
| Dec. 26, 1987 | [JP] | Japan | 62-331145 |

[51] Int. Cl.[6] ..... B65H 5/22; B65H 1/22

[52] U.S. Cl. ..... 271/3.14; 271/109; 271/127; 271/164; 271/9.01

[58] Field of Search ..... 271/3, 4, 6–10, 271/109, 114, 126, 127, 145, 157, 160, 162, 164, 272, 273, 3.14

[56] References Cited

U.S. PATENT DOCUMENTS

| | | | |
|---|---|---|---|
| 4,421,401 | 12/1983 | Kagiura et al. . | |
| 4,478,401 | 10/1984 | Shibuya | 271/22 |
| 4,534,643 | 8/1985 | Watanabe | 271/65 X |
| 4,566,779 | 1/1986 | Coli et al. . | |
| 4,591,884 | 5/1986 | Miyamoto et al. . | |
| 4,605,215 | 8/1986 | Hyltoft | 271/10 X |
| 4,640,604 | 2/1987 | Kozuka et al. | 271/273 X |
| 4,740,817 | 4/1988 | Suzuki et al. | 271/3 X |
| 4,784,274 | 11/1988 | Mori et al. | 271/259 X |
| 4,799,662 | 1/1989 | Sagara et al. | 271/114 |
| 4,809,033 | 2/1989 | Ikemoto et al. . | |
| 4,838,534 | 6/1989 | Ishikawa et al. | 271/10 |

FOREIGN PATENT DOCUMENTS

| | | | |
|---|---|---|---|
| 0201711 | 11/1986 | European Pat. Off. . | |
| 3720458 | 12/1987 | Germany . | |
| 58-78928 | 5/1983 | Japan | 271/9 |
| 198529 | 4/1989 | Japan | 271/3 |
| 2110651 | 6/1983 | United Kingdom . | |
| 2168651 | 6/1986 | United Kingdom . | |

*Primary Examiner*—David H. Bollinger
*Attorney, Agent, or Firm*—Fitzpatrick, Cella, Harper & Scinto

[57] ABSTRACT

Image forming apparatus including sheet feeding apparatus, sheet conveying apparatus, sheet delivering apparatus, structure for supporting the sheet conveying apparatus and sheet delivering apparatus and having an opening side, sheet storing apparatus, and structure for guiding the sheet storing apparatus such that the sheet forming apparatus is detachable from the sheet feeding apparatus at the same opening side.

22 Claims, 14 Drawing Sheets

SHEET FEED APPARATUS FOR IMAGE FORMING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates a sheet fed apparatus for an image forming system and, more particularly, to a sheet feed apparatus for feeding each sheet (i.e., a cut sheet such as a copying sheet, a transfer sheet, or a recording sheet) stored in a sheet storage unit to a main unit (e.g., a copying machine or printer) for receiving each sheet and performing predetermined processing such as image formation on the received sheet.

2. Related Background Art

A typical example of the main unit and sheet feed apparatus described above is shown in FIG. 1. FIG. 1 shows a laser beam printer (LBP) from which a process cartridge and a sheet cassette are detachable.

The laser beam printer includes a printer housing 100, and an image forming mechanism is incorporated in the printer housing 100. The housing 100 is divided into upper and lower halves 100B and 100A. The upper half 100B can be pivoted about a rear end hinge shaft 101 upward with respect to the lower half 100A and can be open, as indicated by the alternate long and short dashed line. The upper half 100B can be pivoted downward and can be closed with respect to the lower half 100A, as indicated by the solid line in FIG. 1.

The upper half 100B is always biased by a spring means (not shown) toward an open direction. When the upper half 100B is completely closed with respect to the lower half 100A against the biasing force of the spring means, a locking mechanism (not shown) is operated to lock the upper half 100B with the lower half 100A. As a result, a closed state can be appropriately maintained, as indicated by the solid line.

When the locking mechanism is released, the upper half 100B is opened by the biasing force of the spring means, as indicated by the alternate long and short dashed line and is held at a predetermined open angle. Most of the interior of the printer can be observed by an operator.

The upper half 100B is raised as described above to largely expose the interior of the printer so as to mount a process cartridge 102 in the printer and perform inspection and maintenance of the interior of the printer.

An open side (left end face in FIG. 1) of the upper half 100B of the printer is its front side. The hinge shaft 101 is located at the rear side (i.e., the right end face in FIG. 1) of the printer.

The process cartridge 102 has a cartridge housing 102a which contains four process units, i.e., a photosensitive drum 103, a charger 104, a developing unit 105, and a cleaner 106. The process cartridge 102 is detachable from a predetermined storage section at about the central portion of the upper half 100B. The cartridge 102 is mechanically and electrically connected to the printer such that mechanical drive and electrical circuit systems of the cartridge and the printer are connected through a coupling member (not shown). A laser scanner unit 107 and a laser reflecting mirror 108 are arranged at predetermined positions inside the upper half 100B.

A sheet cassette 109 is defined as a sheet storage unit. The cassette leading end of the sheet cassette 109 is inserted from a cassette insertion opening 100C formed at the lower front end face of the lower half 100A of the printer. When the sheet cassette 109 is sufficiently inserted in the X direction inside the lower half 100A along a base plate 100D in the lowere half 100A, a boss 109f formed on the outer bottom surface of the cassette is engaged with an engaging recess 100E formed on the upper surface of the base plate 100D, so that the cassette 109 is positioned and mounted in the printer. When the sheet cassette 109 is pulled against the engaging force of the boss 109f and the recess 100E in the Y direction, the cassette 109 can be pulled outside the printer.

The sheet cassette 109 includes a main case 109a and an intermediate plate 109b located inside the case 109a. The rear side of the intermediate plate 109b is biased by a spring 109d to pivot upward about a pivot portion 109c. Sheets (i.e., transfer sheets) S are stacked on and stored in the main case 109a. The sheet S extend on the upper surface of the intermediate plate 109b and the inner bottom surface of the main case 109a. The level of the upper surface of the stack of sheets S is kept unchanged regardless of a decrease in sheets upon feeding of each sheet S or the number of stacked sheets since the intermediate plate 109b is basied upward by the spring 109d.

A separation pawl 109e is engaged with the leading ends of the upper surfaces of the sheets S to separate one sheet from the stacked sheets.

A sheet feed system includes a sheet pickup roller 110, a pair of convey rollers 111a and 111b for conveying the sheet picked up by the sheet pickup roller 110, sheet guide plates 112, 113, and 115, a pair of registration rollers 114, a transfer charger 116, a sheet conveyor belt 117, and a pair of sheet delivery rollers 110. The printer also includes a fixing unit 118. The members 110 to 119 are located at predetermined positions in the lower half 100A.

A sheet delivery opening 100D is formed in the upper front surface of the lower half 100A. The pair of sheet delivery rollers 119 oppose the opening 100D. A delivery sheet tray 100F is mounted in the printer.

When the upper half 100B in which the process cartridge 102 is mounted is closed with respect to the lower half 100A, as indicated by the solid line, the lower surface of the photosensitive drum 103 on the process cartridge 102 side opposes at a normal position the transfer charger 116 mounted in the lower half 100A and is spaced apart therefrom by a predetermined distance. When the sheet cassette 109 is normally mounted in the lower half 100A, the upper surface of the leading end of the stack of sheets S opposes the lower position of the sheet pickup roller 110.

When the image formation start signal is input to a printer control system, the photosensitive drum 103 is rotated at a predetermined peripheral velocity in a direction indicated by an arrow. The outer surface of the photosensitive drum 103 is uniformly charged by the charger 104 to a predetermined polarity (i.e., a positive or negative polarity).

The laser scanner unit 107 generates a pixel laser beam L corresponding to a timer-serial electrical pixel signal of image information input from an original image photoelectric reading unit (not shown), a word-processor (not shown), or a computer (not shown).

The laser scanner unit 107 then scan a surface of the photoelectric drum 103. That is, the uniformly charged surface of the rotating photosensitive drum 103 is sequentially scanned with the laser beam L from the laser scanner unit 107 through the mirror 108 and an exposure window 102b formed in the cartridge housing 102a in the axial direction of the drum. Therefore, a latent image corresponding to image information is formed on the photosensitive drum 103.

The formed latent image is visualized as a tone image by the developing unit 105, and the toner image is transferred to the sheet S fed to a position of the transfer charger 116 between the photosensitive drum 103 and the charger 116.

A convey force is applied to the uppermost sheet S stored in the sheet cassette 109 upon counterclockwise rotation of the pickup roller 110. The leading side of the sheet is moved from a position below the separation pawl 109e to a position above the separation pawl 109e. Only the upermost sheet is picked up and fed in the same direction as the mounting direction of the cassette 109. The sheet is guided by the guide plate 112 and is relayed and conveyed by the pair of convey rollers 111a and 111b. The sheet is then U-turned toward the registration rollers 114 located above the sheet pickup roller 110 in a direction (i.e., from right to left in the printer) opposite to the direction for picking up the sheet from the cassette 109. The U-turned sheet is fed by the registration rollers 114 between the photosensitive drum 103 and the transfer charger 116 through the guide plate 115 from the right in synchronism with rotation of the photosensitive drum 103. Therefore, the toner image formed on the photosensitive drum 103 is transferred to this sheet.

The sheet which received the toner image during feeding of the sheet between th photosensitive drum 103 and the charger 116 from the right to the left is separated from the surface of the photosensitive drum 103 by a separating means (not shown). the sheet is then conveyed in the fixing unit 118 by the conveyor belt 117, and the toner image is fixed. The sheet is then delivery as an image-formed product (print) on the tray 100F through the pair of delivery rollers 119 and the delivery opening 100D. After toner image transfer, a residual toner on the surface of the photosensitive drum 103 is removed by the cleaner 106, and the drum surface is cleaned to prepare for the next image formation cycle.

A rear surface plate 120 of the lower half 100A of the printer can be pivoted downward about a hinge portion 121, as indicated by the alternate long and two short dashed line in FIG. 1. The curved guide plate 112 and the roller 111b of the pair od sheet convey rollers 111a and 111b are disposed inside the rear surface plate 120. When the sheet is jammed in a U-turned sheet path from the sheet pickup roller 110 to the registration roller 114, the rear surface plate 120 is moved down and opened to remove the jammed sheet.

The conventional laser printer described above has the following problems.

(1) Since the feed direction of the sheet S picked up by the sheet pickup roller 110 from the sheet cassette 109 serving as a sheet storage unit inserted in the printer as the main unit is the same as a direction X for inserting the sheet cassette 109 into the printer, the position of the sheet with respect to the cassette is the cassette insertion/mounting leading end. The size of the cassette 109 varies depeneding on different lengths of sheet S. An extended portion of each cassette from the cassette insertion/removal opening 100C toward the front surface of the printer varies depending on different cassette sizes, resulting in poor appearance.

When a cassette 109' (indicated by the alternate long and two short dashed line) which stores longer sheets in the feed direction is mounted in the printer, an extended length P' of the rear end portion of the cassette is increased, and the space for installing the printer is undesirably increased.

(2) Since the sheet S in the cassette 109 is fed from the cassette insertion/mounting direction leading end in a cassette insertion/mounting direction, the fed sheet is U-turned in a direction opposite to the sheet pickup direction and is conveyed to the transfer unit as a sheet processing unit through the sheet guide plates 112 and 113. The frequency of occurrence of jamming in the U-turn guide plates 112 and 113 is higher than that in other portions in practise. In addition, since the U-turn guide plates 112 and 113 are located in the rear portion of the printer, an operator must walk to the rear side of the printer to open the rear surface plate 120 so as to eliminate jamming upon occurence of jamming in the U-turn guide plates 112 and 113, resulting in inconvenience.

(3) The upper sheets S stored in the cassette may be separated above the separation pawl 109e by a shock upon mounting of the cassette 109 in the printer. These sheets are undesirably moved from the cassette front end in the sheet feed direction which is the same as the cassette insertion/mounting direction. This causes a feed error of the sheet and double sheet feeding.

(4) The sheet pickup roller 110, the pair of convey rollers 111a and 111b, and the guide plates 112 and 113 which constitute a sheet feeder unit feeding the sheet S from the sheet cassette 109 as the sheet storage unit to a predetermined unit (transfer unit) of the printer as the main unit are permanetly mounted in the lower half of the printer. If a sheet cassette except for a standard cassette and a paper deck are required due to sheets except for standard sheets, the lower unit including the above members must be replaced with a unit corresponding to the paper size.

SUMMARY OF THE INVENTION

It is an object of the present invention to solve the problems described above and to provide a sheet feed apparatus which can be made compact and has excellent operability, and which can appropriately feed a sheet.

In the sheet feed apparatus according to the present invention, the sheets stacked in the sheet storage unit mounted in the sheet feeder unit are fed in a direction opposite to a direction for mounting the sheet storage unit in the feeder unit and are fed to the main unit. Therefore, problems (1), (2) and (3) posed by the conventional system wherein the sheets stored in the sheet storage unit are fed in the same direction as the sheet storage unit mounting direction can be solved.

The sheet feeder unit can be detachable from the main unit, and therefore, problem (4) can also be solved.

Since the sheet storage unit which is mounted in or removed from the sheet feeder unit includes a sheet convey member, continuous conveyance of the sheet picked up from the sheet storage unit can be assured. Therefore, jamming of the sheet immediately after pickup of the sheet can be greatly reduced.

Even if jamming occurs, the sheet storage unit can be pulled from the feeder unit. The sheet convey member is pulled together with the sheet storage unit. Therefore, an operation for eliminating jamming can be facilitated.

The above-mentioned conventional printer has the following drawback. As previously described, the sheet stored in the cassette 109 serving as the sheet storage unit is picked up forward from the cassette 109 by the sheet pickup roller 110. The sheet is guided by the curved guide plate 112 supported by the rear surface plate which can be pivoted about the hinge portion 121. The sheet is then guided to the sheet convey rollers 111a and 111b. A gap is formed in a sheet transfer portion between the front end serving as a sheet outlet of the cassette 109 and the curve convey guide plate 112. The curved guide plate 112 is supported by the member 120 pivoted about the hinge portion 121. It is therefore difficult to appropriately position the sheet. Jamming often occurs due to a transfer error in the transfer portion between the front end of the cassette 109 and the guide plate 112.

This sheet transfer portion is located in the rear portion of the printer as the main unit. The operator must walk to the rear side of the printer to eliminate jamming in the sheet transfer portion, resulting in inconvenience. This inconvenience can be eliminated by the arrangement of the present invention. A maximum distance, $l_1$ for inserting the sheet storage unit into the sheet feeder unit is larger than a size $l_2$ of the sheet feeder unit in the sheet storage unit inserting/mounting direction (FIG. 3). In a normal state wherein the sheet storage unit is sufficiently inserted into the sheet feeder unit, the front end face of the sheet storage unit is almost aligned with the front end face of the main unit. In the normal state of the sheet storage portion mounted in the sheet feeder unit, no extended portion of the sheet storage unit from the main unit is present regardless of different lengths of the sheet storage unit since the front end face of the sheet storage unit is almost aligned with the front end face of the main unit. Therefore, unlike the conventional case (FIG. 1) wherein rear end portions of the cassette 109 serving as the sheet storage units are extended as the extended portions P and P' on the front side of the printer serving as the main unit, the outer appearance of the printer can be improved.

The distance (maximum insertion stroke) $l_1$ for inserting the sheet storage unit into the sheet feeder unit is larger than the size $l_2$ of the sheet feeder unit in the sheet storage unit mounting direction. Therefore, longer sheet storage unit having a length larger than the size $l_2$ can be inserted into the sheet storage unit. In a normal state wherein the sheet storage unit is mounted in the sheet feeder unit, the rear end portion serving as the insertion leading end of the sheet storage unit extends from the rear end face of the rear portion of the feeder unit or main unit. However, as compared with the front-end outer appearance of FIG. 1, the outer appearance of the present invention can be much improved.

The sheet storage unit includes a vertically pivotal intermediate plate on which sheets are stacked, a spring member for biasing the intermediate plate upward, and a transmission member for transmitting the biasing force of the spring member to the intermediate plate. When the intermediate plate receives the biasing force of the spring member through the transmission member, the intermediate plate is urged upward. However, when the intermediate plate does not receive the biasing force, the intermediate plate is located at the lowermost position by its own weight, so that a large distance is set between the intermediate plate and the one-sheet separation member. During replenishment of the sheet storage unit with sheets, the sheet storage unit must be kept in a state wherein no biasing force is applied to the intermediate plate. In this state, the intermediate plate is kept at the lowermost position, and the distance between the intermediate plate and the one-sheet separation member can be kept to be large. Therefore, the sheets can be quickly replenished without being interfered by a biasing force and the separation member.

Since a biasing spring member is not arranged below the intermediate plate, a low-profile sheet storage unit can be provided.

As compared with the above arrangement, the conventional case has the following drawback.

In the conventional printer as previously described, the separation pawl 109e of the cassette 109 serving as a sheet storage unit is stabilized in a state wherein the separation pawl 109e is urged upward to the highest level at the leading end (or leading end of the sheet on the intermediate plate) of the intermediate plate 109b always biased upward by the spring 109d. In order to replenish the main case 109a with sheets S, the operator must move the intermediate plate 109b downward against the biasing force of the biasing spring 109d while offsetting thr leading ends of the sheets S from the separation pawl 109e.

Operability for replenishing the sheets S into the cassette is thus poor.

In addition, since the spring 109d is present below the intermediate plate 109b, at least a space for minimum height of the spring 109d and a thickness (generally 3 mm or more) of the molded wall of the cassette main case 109a is required. In practice, the spring 109d cannot be compressed to its minimum height due to its fatigue. Therefore, a sufficient margin must be assured to fail to provide a low-profile cassette 40.

The above problem can be solved by the arrangement of the present invention.

BRIEF DESCRIPTION OF THE DRAWINGS

(C) is a longitudinal section side view of cassette insertion portion, and FIG. 15 (D) is a longitudinal sectional side view showing a state wherein the cassette is inserted into the insertion portion.

DESCRIPTION OF THE PREFERRED EMBODIMENTS

Figure 2:
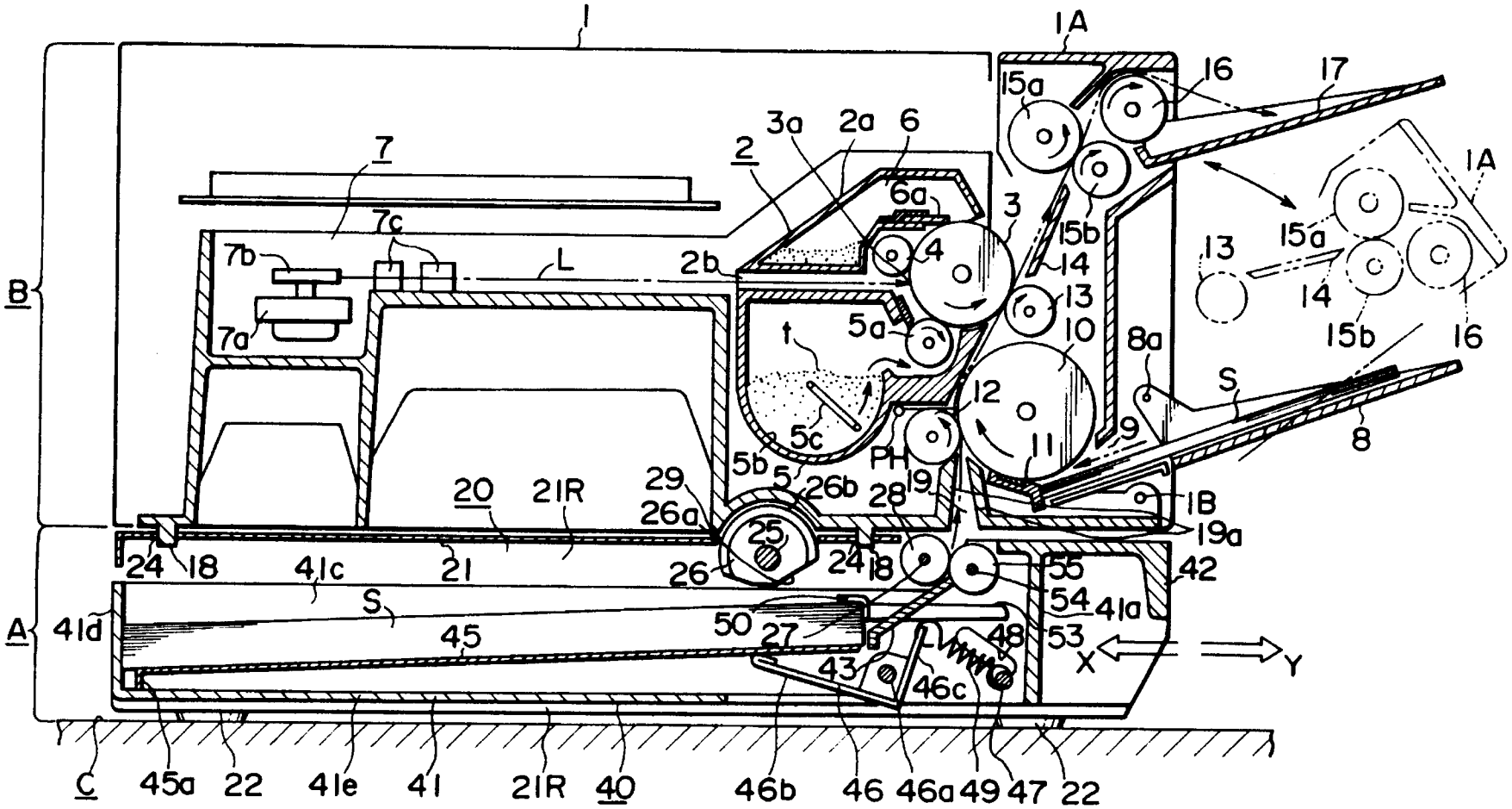
FIG. 2 is a longitudinal sectional view showing a sheet feed apparatus according to an embodiment of the present invention and a printer (LBP) serving as a main unit combined with the sheet feed apparatus.

FIG. 2 is a longitudinal sectional side view showing an arrangement including a sheet feed apparatus A according to an embodiment of the present invention and a laser beam printer B serving as a main unit and combined with the sheet feed apparatus A according to the present invention.

The sheet feed apparatus A is prepared separately from the printer B as the main unit and serves as an optional unit which is detachable from the printer B. The sheet feed apparatus A is placed on a base C, and the printer B as the main unit is placed on the sheet feed apparatus A. Projections 18 extending on the lower surface of the printer B are fitted in recesses 24 formed in an upper surface plate 21 of the sheet feed apparatus A, thereby combining the sheet feed apparatus A with the printer B.

A sheet inlet 19 is formed in the bottom surface of the printer B and corresponds to a nip position between a sheet pickup roller 10 and a sheet convey roller 12, both of which are located inside the printer B. When the printer B is positioned on the sheet feed apparatus A as described above, the sheet inlet 19 of the sheet feed apparatus A is located above a pair of sheet convey rollers 28 and 55 located at the front side portion of the upper surface plate 21 of the sheet feed apparatus A.

The respective components of the present invention will be described below.

I. Printer B

An arrangement and image forming operations of the printer B will be described below. The printer B has a housing 1. The right end face in FIG. 2 is the front surface of the printer B. The housing 1 includes a front surface 1A. the front surface plate 1A can be pivoted about a hinge shaft 1B mounted on the lower side of the housing 1 and is open, as indicated by the alternate long and two short dashed line. The front surface plate 1A can be closed, as indicated by the solid line. The front surface plate 1A is open to largely expose the interior of the printer B in order to mount a process cartridge 2 into the printer B or remove it therefrom or to perform inspection and maintenance.

The process cartridge 2 includes a cartridge housing 2a which contains four image processing units, i.e., a photosensitive drum 3, a charging roller 4, a developing unit 5, and a cleaner 6. The front surface plate 1A is open, as indicated by the alternate long and two short dashed line, to be detachably mounted in a predetermined storage portion in the printer housing 1. When the cartridge 2 is normally mounted in the printer B, mechanical driving systems and electrical driving systems of the cartridge and the printer are mechanically and electrically coupled through a coupling member (not shown).

A laser beam scanner 7 is located deep in the housing 1. The laser beam scanner 7 comprises a semiconductor laser, a scanner motor 7a, a polygonal mirror 7b, and a lens system 7c. A laser beam L from the scanner 7 almost horizontally propagates into the housing 2a through an exposure window 2b formed in the cartridge housing 2a mounted in the printer B. The laser beam L passes through an optical path formed between the cleaner 6 and the developing unit 5 formed in the upper and lower positions in the housing. The laser beam L scans and exposes the surface of the photosensitive drum in its axial direction.

A multifeed tray 8 is attached to the lower end side of the front surface plate 1A so as to extend outward and inclined upward from its proximal end to its distal end. A plurality of sheets S can be simultaneously set on the multifeed tray 8. The tray 8 can be folded about a hinge shaft 8a at the proximal end of the tray 8 to come close to the front surface plate 1A when it is not used. An opening 9 is formed at the lower side of the printer front surface plate 1A. The proximal end of the multifeed tray 8 corresponds to this opening.

A sheet pickup roller 10 is disposed in the lower portion inside the front surface plate 1A. A sheet separation pad 11 is located in contact with the lower side of the sheet pickup roller 10. A convey roller 12 is in contact with the left side of the sheet pickup roller 10. the convey roller 12 is disposed in the printer 1. A transfer roller 13 is located above the pickup roller 10 inside the front surface plate 1A. A pair of fixing rollers 15a and 15b are disposed in the upper portion inside the front surface plate 1A. A sheet guide plate 14 is located between the transfer roller 13 and the pair of fixing rollers 15a and 15b. A sheet delivery roller 16 is located at the sheet outlet. A tray 17 is located at the sheet outlet.

The members 8 to 11 and 13 to 17 are located on the side of the printer front surface plate 1A. In a closed state of the front surface plate 1A with respect to the printer housing 1, as indicated by the solid line, the sheet pickup roller 10 is in contact with the sheet convey roller 12 disposed in the printer housing 1, and the transfer roller 13 is in contact with the right side of the photosensitive drum 3 in the process cartridge 2 mounted in the printer housing 1.

When an image formation start signal is input to a printer control system, the photosensitive drum 3 is rotated counterclockwise as indicated by an arrow at a predetermined peripheral velocity. The outer surface of the photosensitive drum 3 is uniformly charged by the charging roller 4 to a predetermined polarity (i.e., a positive or negative polarity). The charging roller 4 is a conductive member to which a predetermined voltage is applied. The photosensitive drum 3 is charged by this roller in accordance with so-called contact (or direct) charging scheme. The charging roller 4 may be driven by the photosensitive drum 3 or may be rotated in a direction opposite to that of the photosensitive drum 3. Alternatively, the charging roller 4 need not be rotated, or may comprise a friction charging member or a corona charger.

A pixel laser beam L corresponding to a time-serial electrical pixel signal of image information output from on the laser beam scanner 7 is incident on a uniformly charged exposed portion 3a of the photosensitive drum 3. Main scanning with the laser beam L is performed on the surface of the drum 3 in the axial direction, thereby forming a latent image of the image information on the surface of the photosensitive drum 3.

The latent image on the surface of the drum 3 is converted into a toner image by a developing agent carried by a developing sleeve (or roller) 5a of the developing unit 5.

The developing unit 5 includes a hopper 5b for storing a developing agent (toner) t, and a developing agent stirring/convey member 5c which is rotated in a direction of an arrow to stir the developing agent t in the hopper 5a and continuously supply the developing agent to the developing sleeve 5a.

Of the sheets (transfer sheets) S set on the multifeed tray 8, the uppermost sheet is separated from other sheets by the pickup roller 10 which is rotated clockwise and the separation pad 11. The sheet is then fed in the printer through the opening 9. The leading end of the sheet is clamped at the nip portion between the pickup roller 10 and the convey roller 12 and is conveyed toward a contact portion (transfer unit) between the photosensitive drum 3 and the transfer roller 13 at the same speed as the peripheral velocity of the photosensitive drum 3. During feeding, the leading end of the sheet is detected by a sheet sensor PH located at a predetermined position in a sheet path between the pickup roller 10 an the transfer roller 13. The laser beam scanner 7 starts exposure and scanning (image information write operation) the surface of the photosensitive drum 3 in accordance with image information in response to the sheet leading end detection signal.

During feeding between the photosensitive drum 3 and the transfer roller 13, a toner image on the photosensitive drum 3 is transferred to the sheet at the transfer unit by a voltage (i.e., a voltage having a polarity opposite to that of the toner) applied to the transfer roller 13 and a pressure between the transfer roller and the photosensitive drum 3. In this case, the voltage is applied to the transfer roller 13 when the leading end of the sheet reaches the contact portion (transfer unit) between the photosensitive drum 3 and the transfer roller 13. The transfer roller 13 may be a corona charger.

the sheet which has passed through the transfer unit is separated from the surface of the photosensitive drum 3 and is guided to the guide plate 14. The sheet is then guided to the pair of fixing rollers 15a and 15b. Of the pair of fixing rollers 15a and 15b, the roller 15a which is brought into contact with the image surface of the sheet comprises a heating roller incorporating a halogen heater. The roller 15b which is brought into contact with a non-image surface of the sheet comprises an elastic press roller. During feeding of the image-transferred sheet between the pair of rollers 15a and 15b, the toner image is fixed on the sheet surface by heat and pressure. The image-formed product (print) is delivered by the delivery roller 16 onto the tray 17.

A residual toner and other contaminants on the surface of the photosensitive drum 3 are cleaned by a cleaning blade 6a of the cleaner 6, and the photosensitive drum 3 is ready for the next image formation cycle.

II. Sheet Feed Apparatus A

The sheet feed apparatus A comprises a sheet feeder including at least a sheet feed means and its driving means, and a sheet cassette 40 serving as a sheet storage unit detachable from the sheet feeder 20.

(1) Sheet Feeder 20

Figure 4:
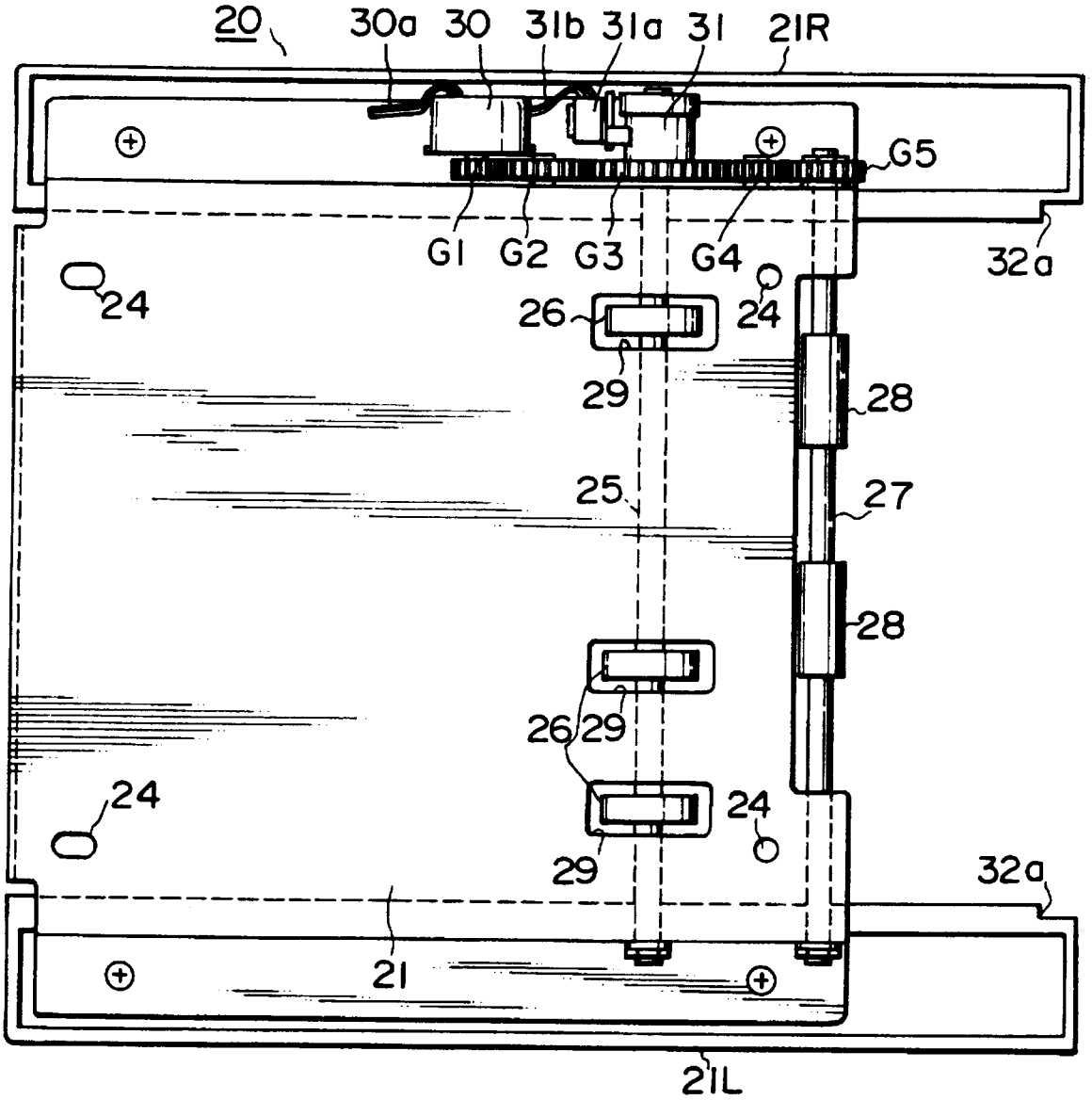
FIG. 4 is a plan view of a sheet feeder.
Figure 5:
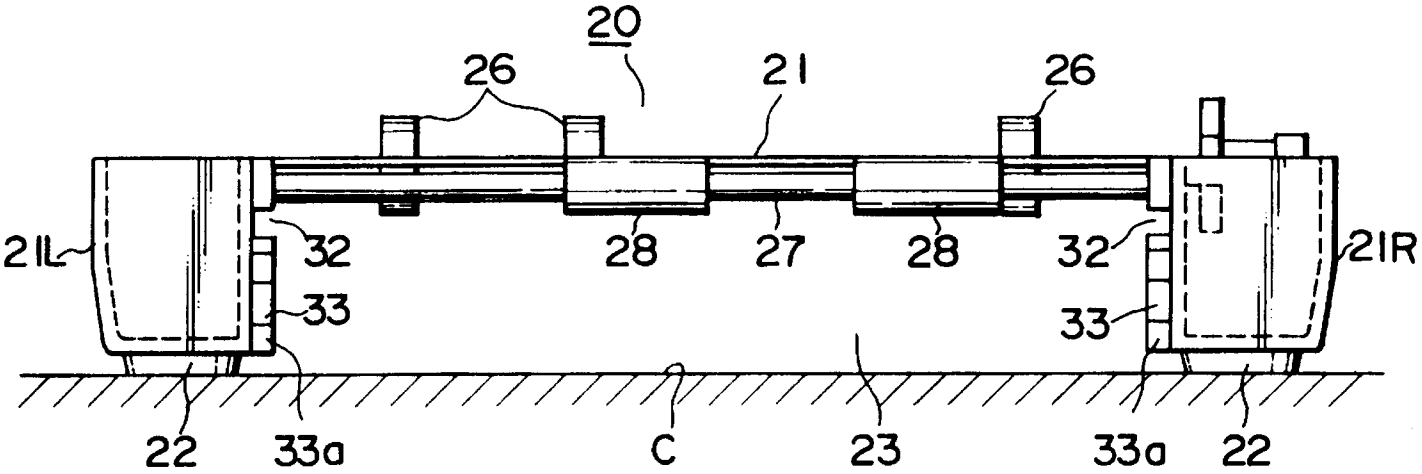
FIG. 5 is a front view of the sheet feeder shown in FIG. 4.
Figure 6:
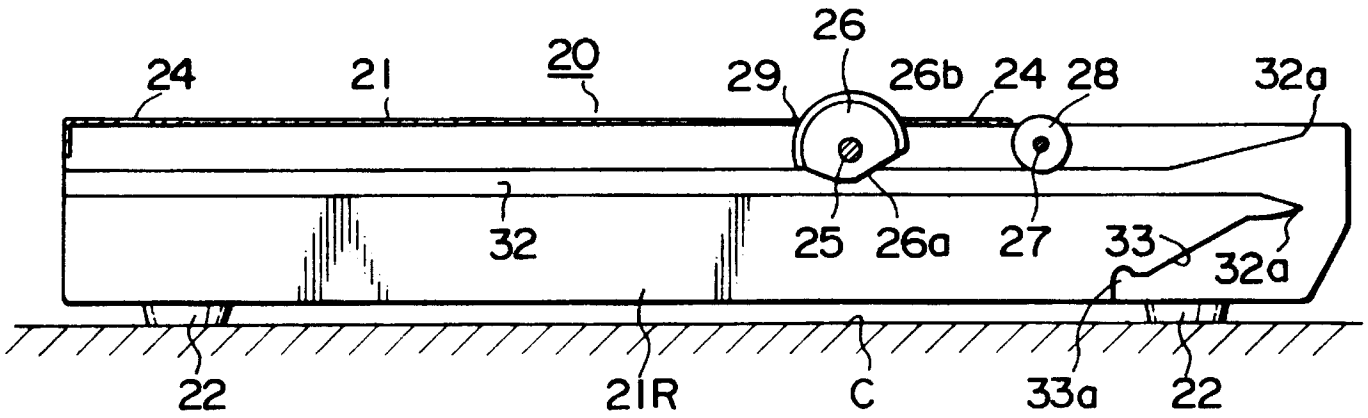
FIG. 6 is a longitudinal sectional side view of the sheet feeder shown in FIG. 4.

FIG. 4 is plan view of the sheet feeder 20, FIG. 5 is a front view thereof, and FIG. 6 is a longitudinal sectional side view thereof.

Referring to FIGS. 4, 5, and 6, the sheet feeder 20 includes a feeder upper surface plate 21, elongated hollow right and left stands 21R and 21L which are mounted on the right and left sides of the upper surface plate 21 so as to be parallel to each other, and pads 22 attached to the lower surfaces of the stands 21R and 21L. When the feeder 20 is placed on a horizontal base C, a sheet cassette storage space 23 (FIG. 5) is defined by the lower surface of the feeder upper surface plate 21, the upper surface of the base C, and the inner side surfaces of the right and left stands 21R and 21L.

Holes (recesses) 24 formed in the feeder upper surface plate 21 are engaged with the corresponding projections 18 (FIG. 2) formed on the lower surface of the printer B to position the printer B on the feeder 20. Therefore, the sheet feed apparatus A is combined with the printer B.

A sheet feed roller shaft 25 is rotatably supported between the stands 21R and 21L through bearings. Rollers 26 are mounted on the shaft 25 and spaced part from each other at predetermined intervals. The rollers 26 serve as three sheet feeding means. Each roller 26 comprises a roller (D-shaped roller) having a sector-shaped section. Each roller 26 is normally stopped such tat its notched portion 26a is directed downward (FIGS. 2 and 6). A sheet convey roller shaft 27 is rotatably supported between the right and left stands 21R and 21L through bearings. Sheet convey rollers 28 are mounted on the shaft 27.

The sheet feed roller shaft 25 is substantially parallel to the sheet convey roller shaft 27. The convey roller shaft 27 is located at the front end portion of the feeder upper surface plate 21 at a position nearer to the upstream side in the sheet feed direction. Arcuated portions 26b opposite to the notched portions of the rollers 26 mounted onthe shaft 25 are partially exposed above the upper surface plate 21 through corresponding through holes 29 formed in the upper surface plate 21.

A stepping motor 30 (FIG. 4) is arranged inside the right stand 21R to drive the feed rollers 26 and the convey rollers 28. A gear train is constituted by gears G1 to G5 which are meshed with each other. The gear G1 is an output gear of the motor 30. The gear G2 serves as an idler gear. The gear G3 is a clutch gear loosely fitted on the right end of the sheet feed roller shaft 25. Engagement/disengagement of the gear G3 is controlled by a one-revolution spring clutch 31. The gear G4 serves as an idler gear. The gear G5 is a convey roller shaft gear integrally mounted on the right end of the sheet convey roller shaft 27.

Upon energization of the motor 30, the output gear G1 is rotated counterclockwise. The gears G2 and G5 interlocked with the gear G1 and then rotated. The idler gears G2 and G4 are rotated clockwise, while the clutch gear G3 and the convey roller shaft gear G4 are rotated counterclockwise. Upon deenergization of a solenoid plunger 31a of the spring clutch 31, the clutch gear G3 is disengaged from the shaft 25 and idles on the shaft 25. In this state, a rotational force is not transmitted to the sheet feed roller shaft 25, and the feed rollers 26 are kept stopped. When the solenoid plunger 31a is temporarily energized, the clutch 31 is actuated and the clutch gear G3 is engaged with the shaft 25. The shaft 25 is rotated counterclockwise. Therefore, the sheet feed rollers 26 are rotated counterclockwise (FIG. 6). Upon one revolution of the shaft 25, i.e., the rollers 26, the clutch is disengaged, i.e., the shaft 25 and therefore the rollers 26 are stopped.

The sheet convey roller shaft 27 and therefore the sheet convey rollers are kept rotated counterclockwise through the gears G1 to G5 regardless of ON-OFF control of the spring clutch 31 while the motor 30 is kept driven.

Energization lead wires 30a and 31b are connected to the motor 30 and the solenoid plunger 31a, respectively. When the printer B is normally set on the sheet feed apparatus A, electrical coupling members (not shown) of the sheet feed apparatus A and the printer B are coupled to each other. The motor 30 and the solenoid plunger 31a are connected to a control circuit (not shown) in the printer B through the lead wires 30a and 31b. Alternatively, a plug (not shown) connected to the terminals of the lead wires 30a and 31b may be inserted into a socket (not shown) in the printer B to connect the motor 30 and the solenoid plunger 31a to the control circuit of the printer B when the printer B is normally set on the sheet feed apparatus A.

Guide grooves 32 (FIGS. 5 and 6) are symmetrically formed on the inner surfaces of the right and left stands 21R and 21L to mount a sheet cassette into the printer or remove it therefrom. Cam grooves 33 are symmetrically formed on the inner surfaces of the front end portions of the right and left stands 21R and 21L.

(2) Sheet Cassette 40

Figure 7:
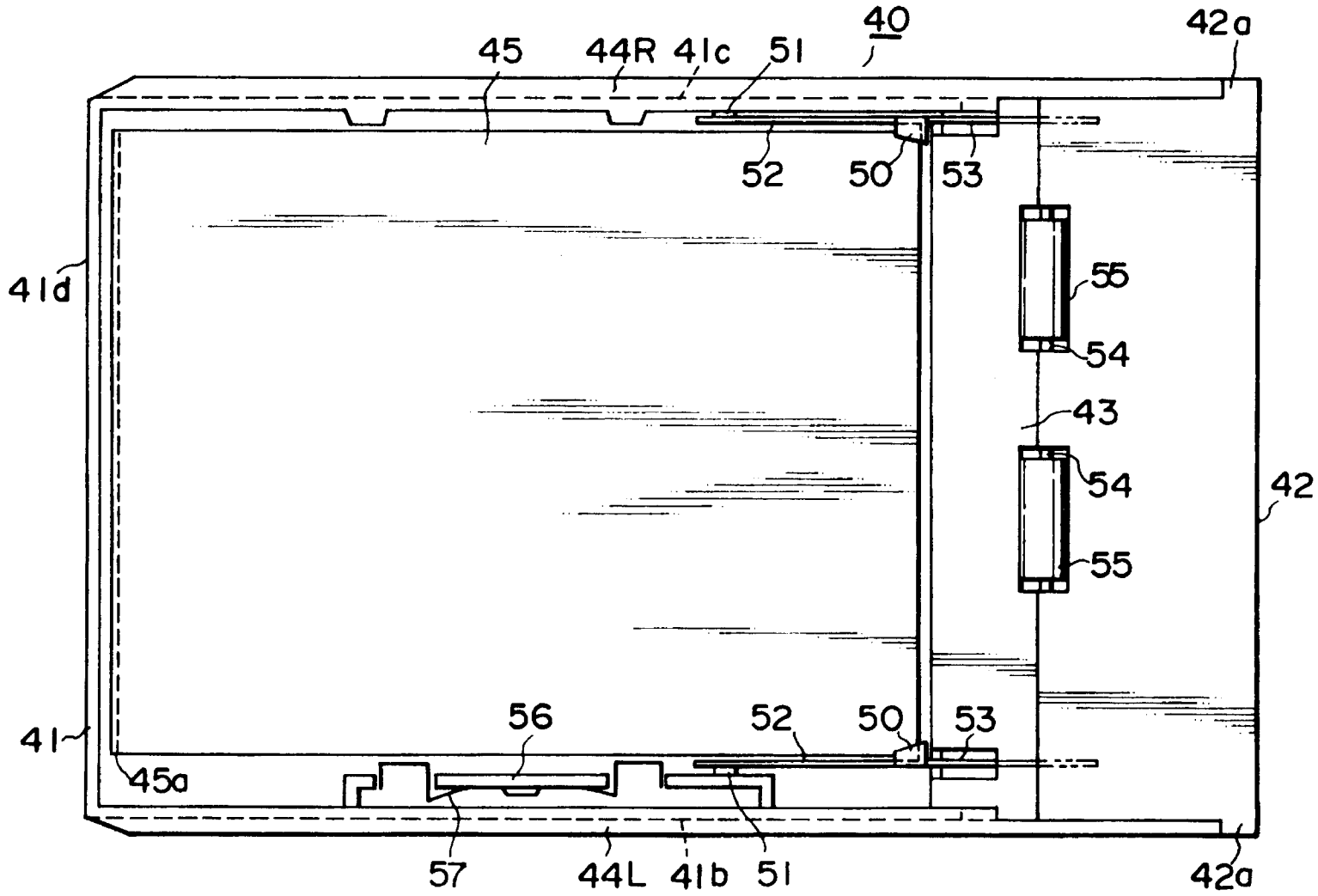
FIG. 7 is a plan view of a sheet cassette.
Figure 8:
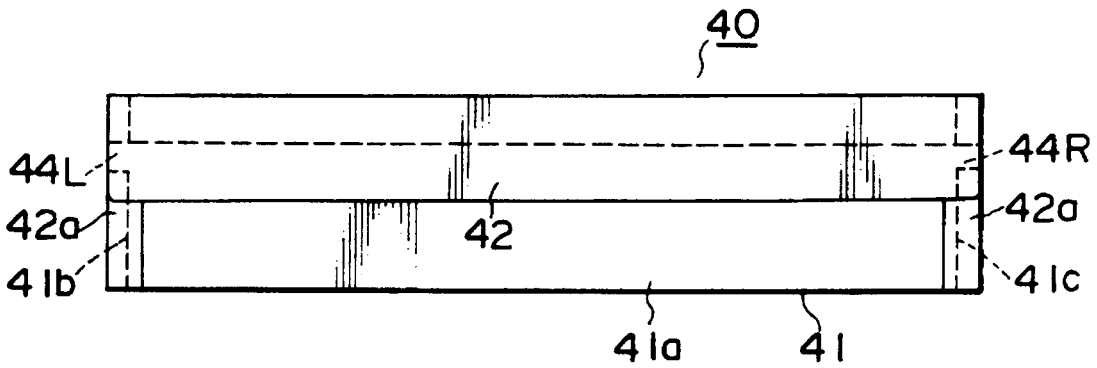
FIG. 8 is a front view of the sheet cassette shown in FIG. 7.
Figure 9:
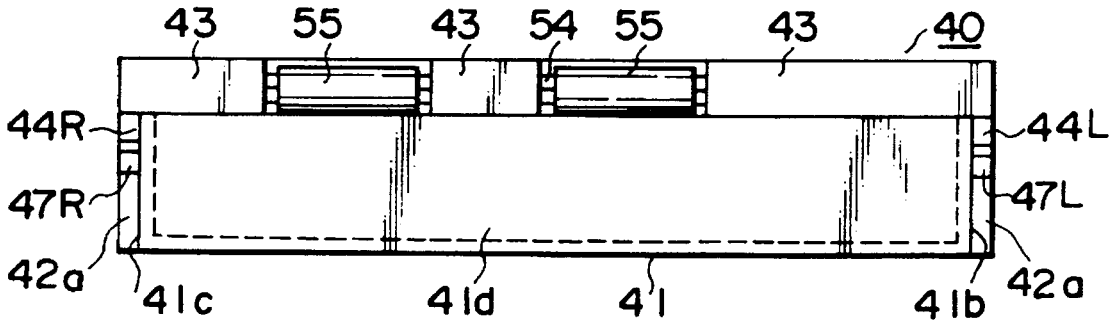
FIG. 9 is a rear view of the sheet cassette shown in FIG. 7.
Figure 10:
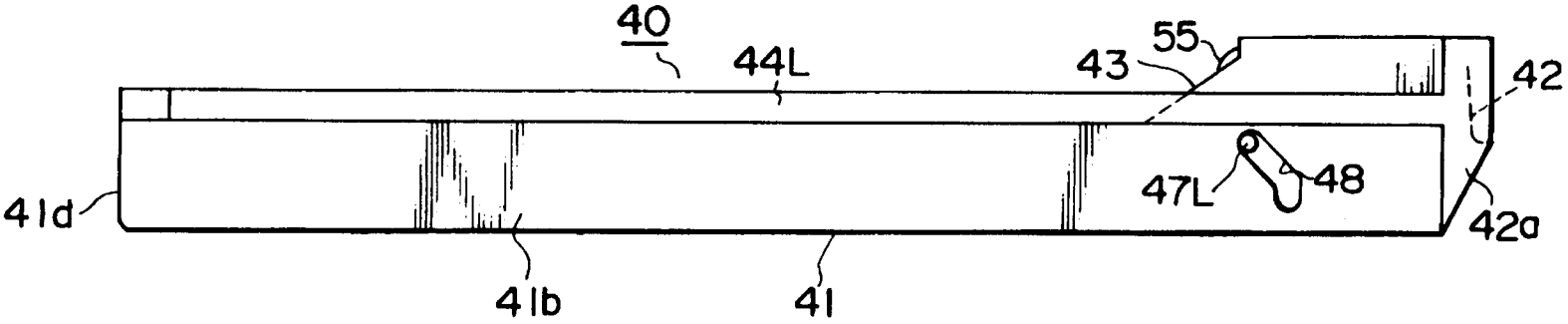
FIG. 10 is aleft side view of the sheet cassette shown in FIG. 7.
Figure 11:
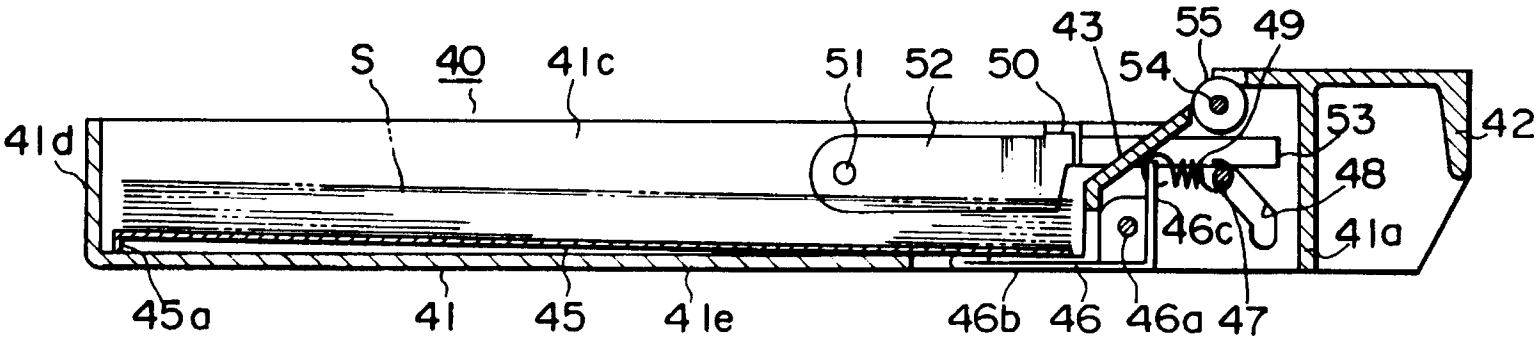
FIG. 11 is a longitudinal sectional side view of the sheet cassette shown in FIG. 7.

FIG. 7 is a plan view of the sheet cassette, FIG. 8 is front view thereof, FIG. 9 is a rear view thereof, FIG. 10 is left side view thereof, and FIG. 11 is a longitudinal sectional side view thereof.

The cassette 40 includes a main case 41 having an open upper surface and a rectangular section. The case 41 includes a front wall 41a, a left side wall 41b, a right side wall 41c, a rear wall 41d, and a bottom plate 41e. A handle 42 is attached to the outer surface of the front wall 41a. A sheet guide plate 43 is mounted on the inner surface of the front wall 41a and inclined upward from its proximal end to its distal end. Elongated flanges 44L and 44R extend outward from the upper sides of the left and right side walls 41b and 41c of the case along the longitudinal direction of the walls 41b and 41c. The case 41 (41a and 41e), the handle 42, the guide plate 43, the left and right elongated flanges 44L and 44R are constituted by a single resin molder member.

An intermediate plate 45 is stored in the case 41. The front end of the intermediate plate 41 can be vertically pivoted about a rear side 45a. The sheets are stacked on the intermediate plate 45 and are stored in the case 41.

An L-shaped pressure lever 46 (FIGS. 2 and 11) srves as a pressure transmitting member for vertically pivoting the intermediate plate 45. The level 46 can be pivoted about a shaft 46a mounted at the front end of the intermediate plate 45. One horizontal arm 46b is located below the lower surface of the front end portion of the intermediate plate 45. When the lever 46 is pivoted clockwise about the shaft 46a, the horizontal arm 46b is raised, and the intermediate plate 45 is pivoted upward about the rear side 45a (from a state in FIG. 11 to a state in FIG. 2).

A pressure shaft 47 is located in front of the level 46. The left and right ends of the shaft 47 are fitted in symmetrical oblique slots 48 formed in left and right side walls 41b and 41c of the case, respectively. Left and right end portions 47L and 47R (FIGS. 9 and 10) of the shaft 47 are exposed outside the left and right side walls. A tension coil spring 49 is hooked between the pressure shaft 47 and a vertical arm 46c of the lever 46.

In a state (FIG. 11) wherein the sheet cassette 40 is removed from the sheet feeder 20, the lever 46 receives a force by the weight of the intermediate plate 45 and the sheets S stacked thereon. By this force, the lever 46 tends to be pivoted counterclockwise about the shaft 46a, and the horizontal arm 46b is almost laid in the horizontal direction. At the same time the intermediate plate 45 also laid on the inner bottom surface of the case 41. In this state, the pressure shaft 47 receives a tension from the vertical arm 46c of the lever 46 through the coil spring 49, and the left and right ends 47L and 47R are held at the upper end points of the oblique slots 48.

A pair of right and left separation pawls 50 separate the uppermost sheet from the remaining sheets and are mounted on the distal end portions of levers 52 which can be vertically pivoted about shafts 51. The pair of right and left separation pawls 50 correspond to the right and left corners of the leading end of the uppermost one of the sheets S stacked on the intermediate plate 45 in the case 41. Lever extended portions 53 are formed by extending the distal end portions of the levers 52 over the positions of the separation pawls 50, respectively. The extended portions 53 are located above the pressure shaft 47. In the state (FIG. 11) wherein the sheet cassette 40 is removed from the sheet feeder 20, the extended portions 53 are placed on the pressure shaft 47 whose end portions are pulled to the upper end positions of the oblique slots 48. The levers 52 are held to be almost horizontal, and their downward pivotal movement is prevented. As a result, downward movement of the pawls 50 is also prevented.

Rollers 55 serving as sheet convey members and located on the side of the upper side of the sheet guide plate 43 are rotatable about a shaft 54. The sheet convey rollers 55 are driven rollers which are paired with the sheet convey rollers 28 serving as driving rollers (FIG. 2) on the feeder 20 side. When the sheet cassette 40 is sufficiently inserted and mounted in the feeder 20, the sheet convey rollers 55 are located at positions corresponding to the sheet convey rollers 28 in the feeder 20 and are brought into contact therewithy. In this case, the rollers 55 are biased by a biasing means (not shown) toward the rollers 28 and are threfore in contact with the rollers 28 at a predetermined pressure.

A stacked sheet side press member 56 (FIG. 7) is mounted inside the left side wall 41b of the case 41, and a biasing spring plate 57 urges the side press member 56 against the side surfaces of the stacked sheets at a predetermined pressure.

(3) Storage of Sheets in Cassette 40

Stacking and storage (to be described in detail later) of the sheets S in the sheet cassette 40 are performed through the upper surface opening of the case 41 after the cassette 40 is removed from the feeder 20. In the state (FIG. 11) wherein the cassette 40 is removed from the feeder 20, the intermediate plate 45 in the case 41 is laid on the inner bottom surface, i.e., located at the lowermost pivotal position, as described above. The extended portions 53 of the levers 52 having the separation pawls 50 are supported on the pressure shaft which is pulled upward to the upper end positions of the oblique slots 48. The levers 52 are kept almost horizontal and their downward movement is prevented. Therefore, the levers 52 are located near the upper surface opening of the case 41. Spaces between the front end of the intermediate plate 45 and the separation pawls 50 are kept large, and the sheets S can be quickly stored into the case 41.

Figure 1:
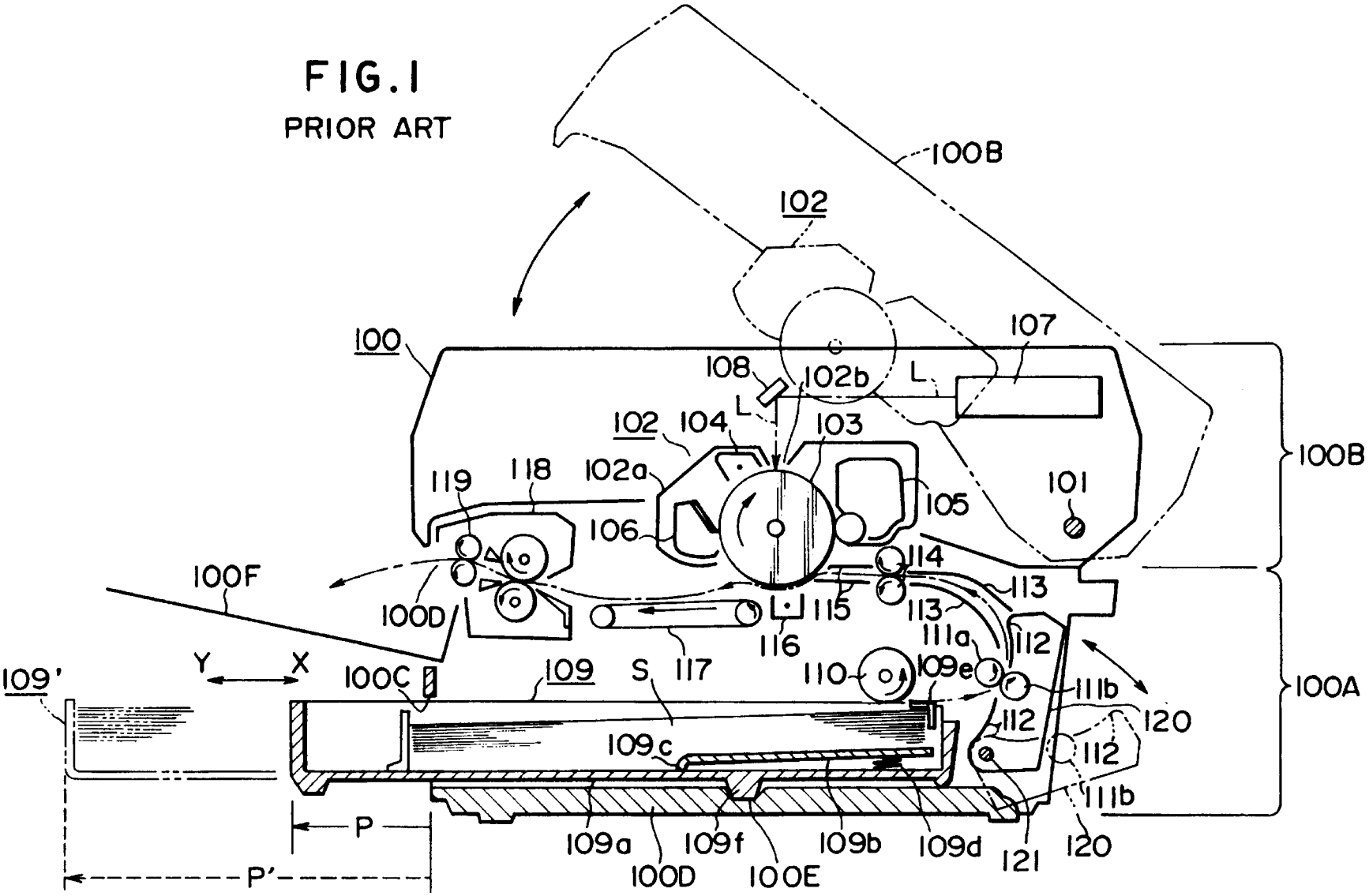
FIG. 1 PRIOR ART
FIG. 1 is a longitudinal sectional side view showing a conventional sheet feed apparatus.

In the conventional cassette 109 shown in FIG. 1, the separation pawl 109e is stabilized at the uppermost level at the front end of the intermediate plate 109b or the leading end of the sheet S which is always biased upward by the sping 109d. The sheets S are replenished into the case 109a while the intermediate plate 109b is moved downward against the biasing force of the spring 109d so as to offset the separation pawl 109e. Operability for sheet replenishment is degraded, as previously described.

The cassette 40 of the present invention can eliminate this drawback.

(4) Mounting of Cassette 40

The sheet cassette 40 is mounted in the feeder 20 as follows. The cassette 40 inserted (a direction of an arrow X in FIG. 1) from the front surface of the feeder 20 into the sheet cassette storage space 23 (FIG. 5) defined by the lower surface of the upper surface plate 21, the upper surface of the base C, and the inner side surfaces of the right and left stands 21R and 21L of the feeder 20. In this case, the rear surface wall 41d of the cassette 40 is a leading end during insertion, and the elongated flanges 44R and 44L at the right and left sides of the cassette are fitted in the corresponding guide grooves 32 formed on the inner surfaces of the right and left stands 21R and 21L.

When the cassette 40 is sufficiently inserted into the feeder 20, lower surfaces of projections 42a of the handle 42 on the front surface of the cassette abut against distal end portions 32a (FIGS. 4 and 6) of the guide grooves 32, and further insertion of the cassette 40 can be prevented. The cassette 40 can be set in the feeder 20 at a proper insertion position. In this mounting state, the front end (i.e., the trailing end) of the cassette 40 is almost aligned with the front surface of the printer B, and an extended portion of the cassette 40 outside the printer B can be eliminated. The extended portions P and P' of the trailing ends of the conventional cassettes in FIG. 1 toward the front side of the printer can be eliminated, thereby improving the outer appearance.

Figure 3:
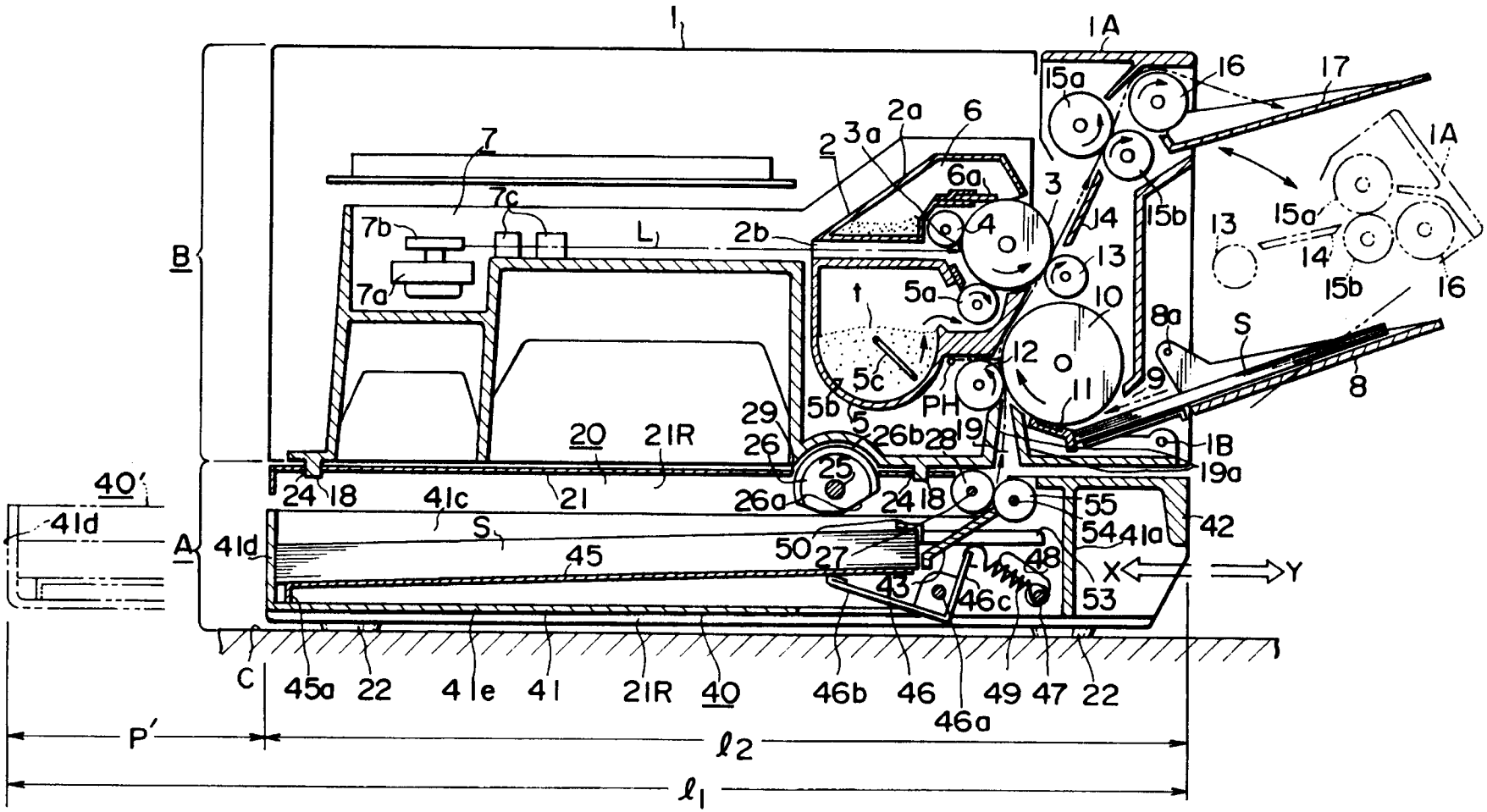
FIG. 3 is an longitudinal sectional side view showing a relationship between a cassette size and an extension length in an image forming apparatus shown in FIG. 2.

As shown in FIG. 3, the maximum insertion distance $l_1$ of the cassette 40 into the feeder 20 is set to be larger than the size $l_2$ of the feeder 20 in the cassette mounting direction. The cassette 40' having a length larger than the size $l_2$ can be inserted and mounted in the feeder 20. In this case, in the state wherein the cassette 40' is normally mounted in the feeder 20, the rear end (i.e., the leading end) of the cassette 40' appears as indicated by the alternate long and short dashed line in FIG. 3, thus exposing the extending portion P' outside the rear portion of the feeder 20 or the printer B serving as the main unit. As previously described, unlike the extended portions P and P' of the cassettes 109 in the conventional case, the outer appearance can be improved.

The sheet feed rollers 26 located on the side of the upper surface plate 21 of the feeder 20 are rollers (D-shaped rollers) each having a sector-shaped section. Each roller 26 is stopped while its notched portion 26a is directed downward. Therefore, when the cassette 40 is inserted into the feeder 20, the upper side of the rear wall 41d of the case 41 passes under the notched portions 26a of the sheet feed rollers 26 and is not in contact therewith.

The intermediate plate 45 does not receive an upward pivotal force from the pressure level 46 until the cassette 40 is sufficiently inserted into the feeder 20 and normally mounted therein. The intermediate plate 45 is kept laid on the inner surface of the bottom plate 41c of the case 41, as shown in FIG. 11. The sheets S on the intermediate plate 45 are horizontally stored in the case 41. During insertion of the cassette 40 into the feeder 20, the upper surface of the uppermost sheet of the sheets S stacked in the case 41 is spearated from the notches portions 26a of the sheet feed roller 26. No interference between the upper surface of the uppermost sheet S in the cassette 40 and the feed rollers 26 occurs.

The feed rollers 26 in the feeder 20 are constituted by rollers each having a sector-shaped section, and the notches 26a are normally directed downward. Therefore, the sheet cassette storage space 23 defined by the lower surface of the upper surface plate 21, the upper surface of the base C, and the inner side surfaces of the right and left stands 21R and 21L can have a sufficient height. Therefore, the capacity for storing the sheet cassette 40 can be increased.

The right and left end portion 47R and 47L of the pressure shaft 47 extending outward from the right and left side walls 41c and 41b of the cassette 40 are respectively engaged with the cam grooves 33 formed on the inner surfaces of the right and left stands 21R and 21L of the feeder 20 immediately before the cassette 40 is normally mounted in the feeder 20 upon insertion of the cassette 40 into the feeder 20. The right and left end portions 47R and 47L of the pressure shaft 47 receive a downward force by the insertion force of the cassette 40 along the cam grooves 33. The shaft 47 is moved downward since its both ends fitted in the oblique slots 48 are moved from the upper end points to the lower end points. Upon downward movement of the pressure shaft 47, the pressure lever 46 is pivoted clockwise about the shaft 46a through the tension coil spring 49. The horizontal arm 46b of the lever 46 is raised, and the intermediate plate 45 which supports the sheets S is pivoted about the rear side 45a so as to be inclined from the rear side to the front side.

When the cassette 40 is sufficiently inserted and normally mounted in the feeder 20, both the ends of the pressure shaft 47 reach the lower end points. More specifically, the right and left end portions 47R and 47L are held by lower ends 33a (FIG. 5) of the cam grooves 33.

Since the pressure shaft 47 which supports the extended portions 53 of the separation pawl levers 52 is moved downward along the slots 48, the levers 52 are pivoted downward (clockwise) about the shafts 51 at the initial period of downward movement. However, the separation pawls 50 are received by the corners of the leading end of the sheets S moved upward by upward pivotal movement of the front end of the intermediate plate 45 upon further downward movement of the pressure shaft 47. Therefore, further downward movement of the levers 52 is prevented, and the pressure shaft 57 is separated from the lever extended portions 53. The separation pawls 50 are placed on the stacked sheets S by their own weight since the extended portions 53 are separated form the pressure shaft 57. Therefore, each pawl is operated as a one-sheet separation pawl.

The sheet convey rollers 55 in the cassette 40 are respectively in contact (FIG. 2) with the front sides of the sheet convey rollers 28 in the feeder 20 when the cassette 40 is completely mounted in the feeder 20.

FIG. 2 shows positions and states of the respective members of the sheet feed apparatus A when the cassette 40 is perfectly mounted in the feeder 20.

(5) Operation of Feeder 20

When a mode for using the sheet feed apparatus A is selected at the console of the printer B serving as the main unit and an image formation start signal is input to a control circuit in the printer B, the stepping motor 30 in the feeder 20 is energized and is rotated. Upon rotation of the motor 30, the gears G1 to G5 are rotated, and the sheet convey rollers 28 are rotated counterclockwise in FIG. 2.

The sheet convey rollers 55 of the cassette 40 which ar brought into contact with the rollers 28 and paired therewith are driven. The sheet feed rollers 26 are kept stopped since the one-revolution spring clutch 31 is kept in a disengaged state. Thereafter, when the solenoid plunger 31a of the feeder 20 is temporarily energized from the control circuit of the printer in accordance with a sheet feed start signal, the spring clutch 31 is engaged, and the sheet feed rollers 26 are rotated clockwise (FIG. 2) by one revolution. Upon one revolution of the feed rollers 26, the arcuated portions 26a of the rollers 26 are brought in contact with the upper surface of the uppermost sheet of the sheets stacked on the intermediate plate 45. A feed force in a direction opposite to the direction X for mounting the cassette 40 in the feeder 20 acts on the upper surface of the uppermost sheet. The uppermost sheet is separated from other sheets s by the separation pawls 50 and is fed in a direction of the front wall 41a of the cassette 40.

The leading end of the fed sheet is guided by the guide plate 43 and gripped by the nip portion between the pair of sheet feed rollers 27 and 55 from the lower direction. The sheet is then conveyed upward and is fed in the printer B through the sheet inlet 19. The sheet fed in the printer is gripped by the nip portion between the feed and convey rollers 10 and 12 in the printer B through a guide plate 19a. The sheet is then fed to the transfer roller 13. An image formation operation in the printer B is the same as that in the sheet feed mode from the multifeed tray 8, as previously described.

Upon every revolution of the sheet feed rollers 26 in the feeder 20, each sheet stored in the cassette 40 mounted in the feeder 20 is fed to the printer B, and an image is formed on the fed sheet.

When the number of sheets S stacked on the cassette 40 is decreased, the intermediate plate 45 is pivoted upward upon clockwise pivotal movement of the pressure lever 46 by a charged force of the tension coil spring 49. The vertical level of the uppermost sheet S on the intermediate plate 45 at the leading end of the sheet is kept at a predetermined level. Therefore, stable separation and feeding of each sheet can be performed.

(6) Removal of the Cassette 40

In order to remove the cassette 40 from the feeder 20, fingers are hooked to the handle 42 at the front end face of the cassette to pull the cassette 40 from the feeder 20 in a direction opposite to the cassette mounting direction X as indicated by an arrow Y in FIG. 2.

In an initial period of removal of the cassette 40, the right and left end portions 47R and 47L of the pressure shaft 47 in the cassette 40 are respectively disengaged from the cam grooves 33 on the inner side surfaces of the right and left stands 21R and 21L of the feeder 20. In this state, the pressure shaft 47 can be freely moved. A clockwise biasing force is released from the pressure lever 46. The lever 46 is pivoted counterclockwise by the weight of the intermediate plate 45 and the sheets S stacked thereon. As shown in FIG. 11, the intermediate plate 45 is laid on the inner bottom surface of the case 41 again. The pressure shaft 47 is returned to the initial state wherein both the end portions of the shaft 47 are kept at the upper end positions. The extended portions 53 are supported on the pressure shaft 47 which is returned to the upper end point and is kept almost horizontal.

The sheet feed apparatus A of this embodiment is prepared as an optional unit which can be detachably added to the main unit B such as a printer or copying machine, as needed. Each sheet feed roller 26 has a sector-shaped section to allow longer sliding of the sheet cassette 40 in the feeder 20. Therefore, the sheet feed apparatus B can be entirely set below the main unit B. Furthermore, the sheet feed apparatus A can be mounted into the feeder or removed therefrom from the front side of the main unit which is a manipulation side of the main unit B. According to the sheet feed apparatus A, the height of the main unit B is only slightly increased, and an extended portion of the cassette 40 outside the front side of the main unit can be eliminated even in an optional arrangement. Operability of the sheet feed apparatus is equivalent to that of the main unit B, and the sheet feed apparatus is matched with the main unit B in view of design, thereby providing excellent operability and design.

The feed direction of the sheet stacked on the cassette 40 mounted in the feeder 20 is opposite to the direction for mounting the cassette 40 in the feeder 20. Therefore, the cassette 40 can be easily mounted into the main unit B from the front side or removed therefrom, and the operator need not walk to the rear side of the main unit B even upon occurrence of jamming, thus resulting in convenience.

Although the sheet feed apparatus A consisting of the feeder 20 and the cassette 40 is located below the main unit B, jamming troubleshooting and other troubleshooting operations can be performed on the front side even if the cassette 40 has a long mounting stroke. This can be realized because the mounting direction of the cassette 40 into the feeder is opposite to the feed direction of the sheet.

Since the sheet feed apparatus A consisting of the feeder 20 and the cassette 40 is located below the main unit B, the height of the system is only slightly increased by the number of sheets S stacked and stored in the cassette 40. The main unit B is not adversely affected by this arrangement. That is, design flexibility can be facilitated, and system expansion can be achieved by slightly modifying the design specifications.

When the cassette is inserted into and mounted in the main unit in the same convey direction of the sheet as in the conventional system, the leading end of the sheet is extended from the front end of the cassette by an inertia generated by a shock upon mounting of the cassette. If a separation pawl type cassette is used, a strong force acts on the separation pawls to deform them, or movement of the separation pawl is degraded. However, when the cassette is inserted into the main unit in a direction opposite to the feed direction of the sheet, the above inertia acts in the opposite direction, thereby eliminating the conventional drawback described above.

The sheet convey rollers 55 in the cassette 40 may comprise driving rollers as in the rollers 28 in the feeder 20.

In addition, the spring force for lifting the intermediate plate 45 is used to confirm a click at the end of mounting of the cassette 40 or to prevent the cassette 40 from removal. An additional spring and a cassette removal mechanism need not be arranged in the cassette 40 and the feeder 20, thus realizing a low-cost arrangement.

When the cassette 40 is removed from the feeder 20, the spring 49 for lifting the intermediate plate 45 receives almost no load, and the service life of the spring 49 is also prolonged.

A space is assured in the cassette 40 in the feed direction and is utilized as the handle 42. In this case, the spring 49 may be arranged at the front end portion of the cassette in the sheet feed direction to minimize the thickness of the cassette 40. Therefore, the sheet feed apparatus A and hence the main unit B can be made compact.

Figure 12A:
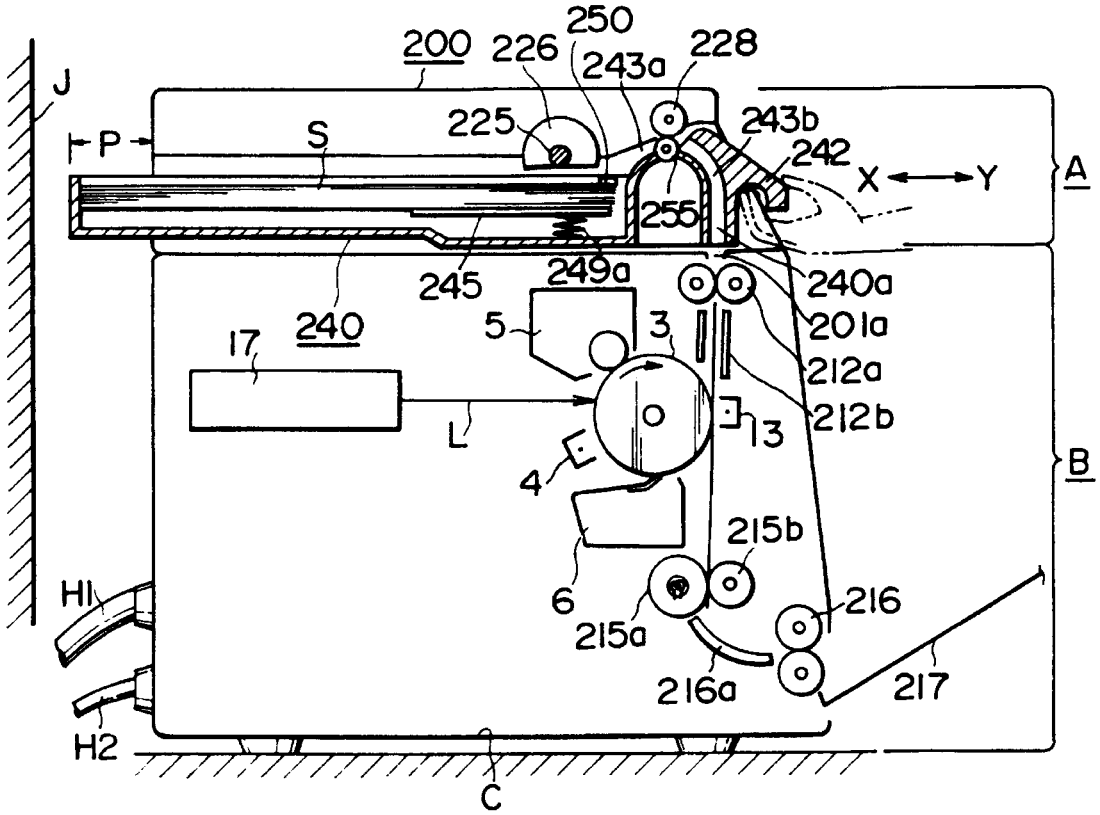
FIG. 12(A), 12(B), AND 12(C) are views showing a sheet feed apparatus according to another embodiment of the present invention.
Figure 12B:
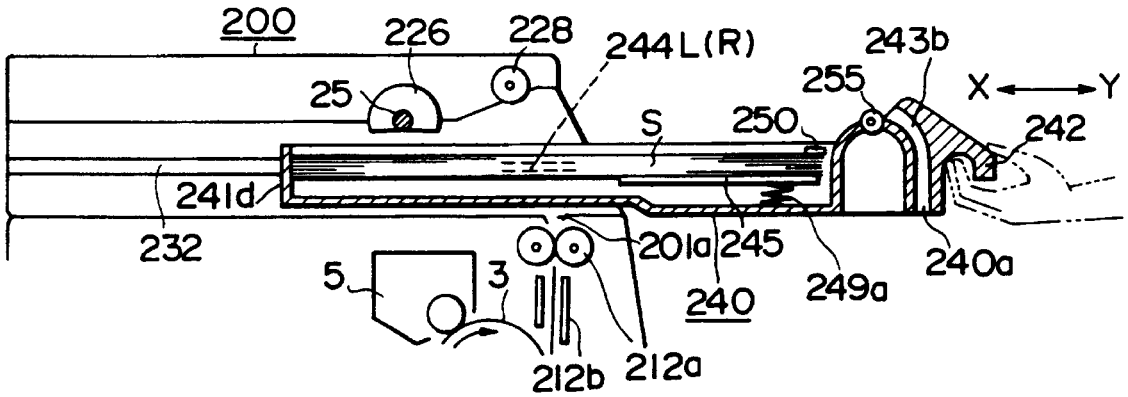
Figure 12C:
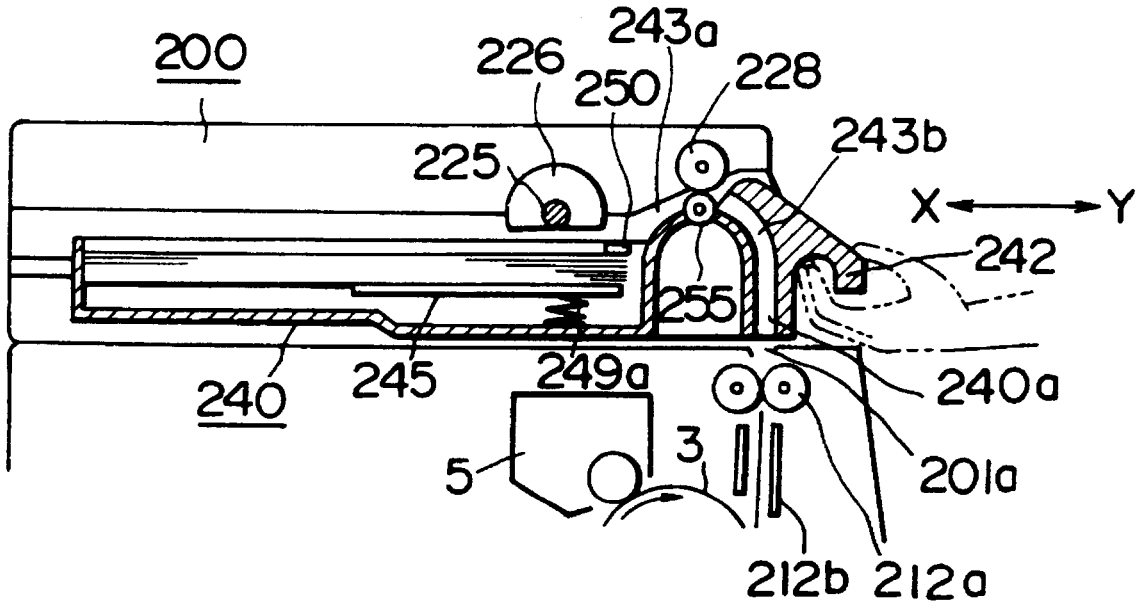

III Other Embodiments (1) FIGS. 12(A), 12(B), and 12(C)

In this embodiment, a sheet feed apparatus A is placed on a printer B serving as a main unit.

The sheet feed apparatus A comprises a sheet feeder 200 and a sheet cassette 240 which can be detachably mounted in the sheet feeder 200 through elongated flanges 244R and 244L and guide grooves 232. The cassette 240 can be inserted into the feeder 200 and can be removed therefrom from the front side. FIG. 12(A) shows a state wherein the sheet cassette 240 is mounted in the feeder 200, and FIG. 12(B) shows a state wherein the sheet cassette 240 is being mounted in the feeder 200 or removed therefrom.

Sheets S are stacked on an intermediate plate 245 in the cassette 240. The front end of the intermediate plate 245 is lifted by a spring 249a. Separation pawls 250 are provided at the right and left corners of the leading end of the uppermost sheet of the stacked sheets S.

In the state wherein the cassette 240 is mounted in the feeder 200, as shown in FIG. 12(A), sheet feed rollers 226 of the feeder 200 are rotated counterclockwise by one revolution, and the uppermost sheet of the sheets stacked in the cassette 240 is fed in a direction opposite to a direction X for mounting the cassette 240 into the feeder 200. Therefore, the sheet is guided by a guide 243a and gripped by the nip portion between sheet convey rollers 228 of the feeder 220 and rollers 255 of the cassette 240, and is guided downward by a downwardly curved guide 243b.

The sheet is fed in the printer from a sheet outlet 240a in the bottom surface of the cassette to a sheet inlet 201a formed in the upper surface of the printer B. The sheet fed in the printer is subjected to image transfer by an image transfer unit (i.e., a corona charger) 13 of a photosensitive drum 3 through a path from registration rollers 212a and guide plates 212b and is then delivered onto a delivery tray 217 through a pair of fixing rollers 215a and 215b, a guide plate 216a, and a pair of delivery rollers 216.

The feeder 200 in the sheet feed apparatus A may be permanently mounted on the upper surface plate of the printer B serving as a main unit. Alternatively, the feeder 200 may be prepared as an optional unit and detachably mounted on the upper surface plate. In this case, various types of sheets can be fed by replacing the feeders 200.

Since the sheet is guided by the guide 243b from the cassette 240 to the printer B serving as the main unit in a substantially vertical direction, a sheet path can be shortened as compared with a conventional arrangement. The substantially vertical guide 243b is formed in the cassette 240 which is detachably mounted in the feeder 220. During jamming troubleshooting operation, the cassette 240 is pulled from the feeder 200 to open the sheet path, thereby facilitating the processing.

The cassette 240 is inserted into and mounted in the feeder 200 by using the feeder front surface side as a reference side. When a cassette having a given length in the sheet feed direction is used and mounted in the feeder 200, the rear end portion of the cassette 240 extends outside the rear end surface of the feeder 200 or the printer B serving as the main unit. However, since a power source cord H1, an interface cord H2, and the like extend from the rear end face of the printer B serving as the main unit, no problem is posed. The rear surface of the printer B cannot be brought into contact with a wall surface J or the like due to the presence of cords and the like on the rear surface of the printer B. A given distance is required between the rear surface of the printer B and the wall surface J, and therefore an extended portion P of the rear end portion of the cassette 240 will not reduce the effective installation space. To the contrary, an extended portion can be eliminated from the front side, thus improving front-side design and operability.

Regarding the extending portion P of the rear end portion of the cassette 240, assume that a sheet feed apparatus having a maximum feed capacity corresponding to a width LTR (width: 8.5") is used. If the rear end portions of LTR (length: 11") and A4 (length: 297 mm) cassettes are set not to be extended from the rear end face of the feeder 200, but only a rear end portion of an LGL (length: 14") cassette is extended outside from the rear end face of the feeder 200, the LTR and A4 cassettes are frequently used. Therefore, the rear end portions of the cassettes do not appear outside the rear end portion of the feeder 200, thus providing a good outer appearance, as shown in FIG. 12(C).

Figure 13A:
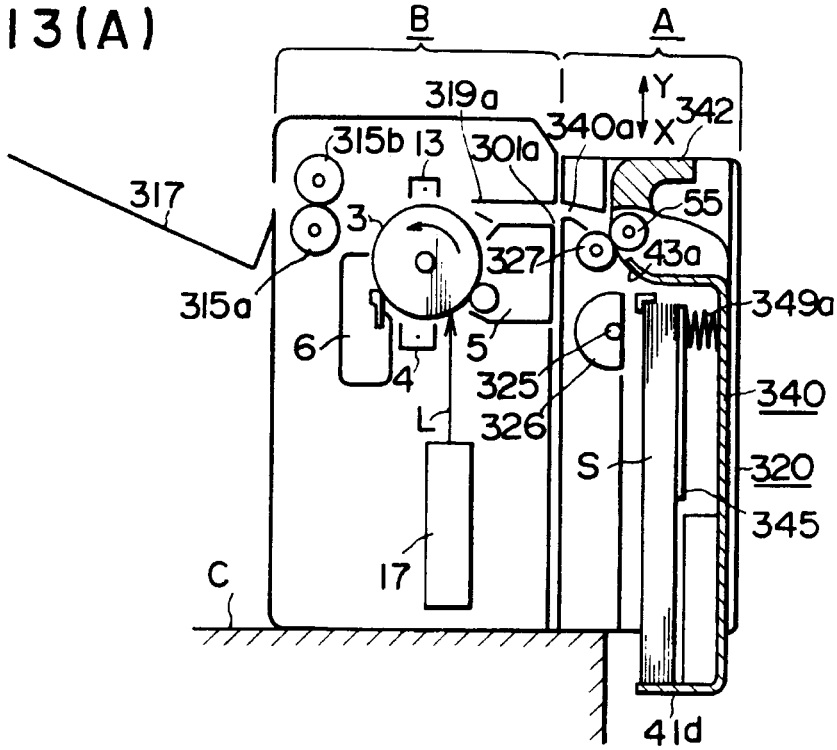
FIGS. 13(A) and 13(B) are views showing a sheet feed apparatus according to still another embodiment of the present invention.
Figure 13B:
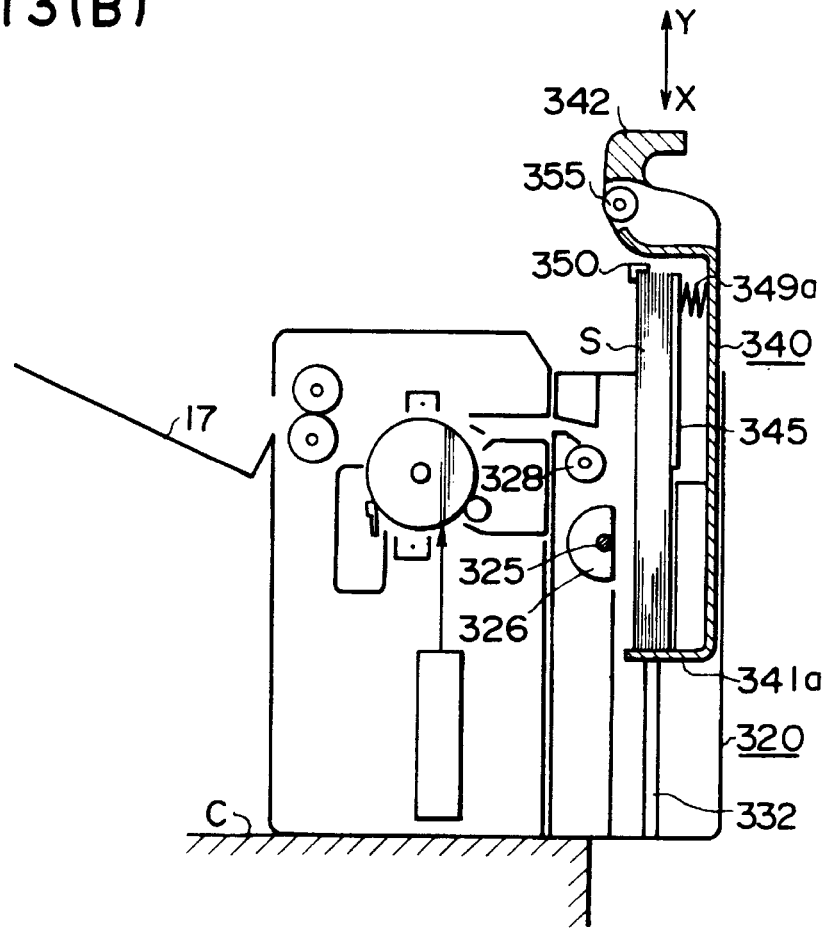
Figure 14:
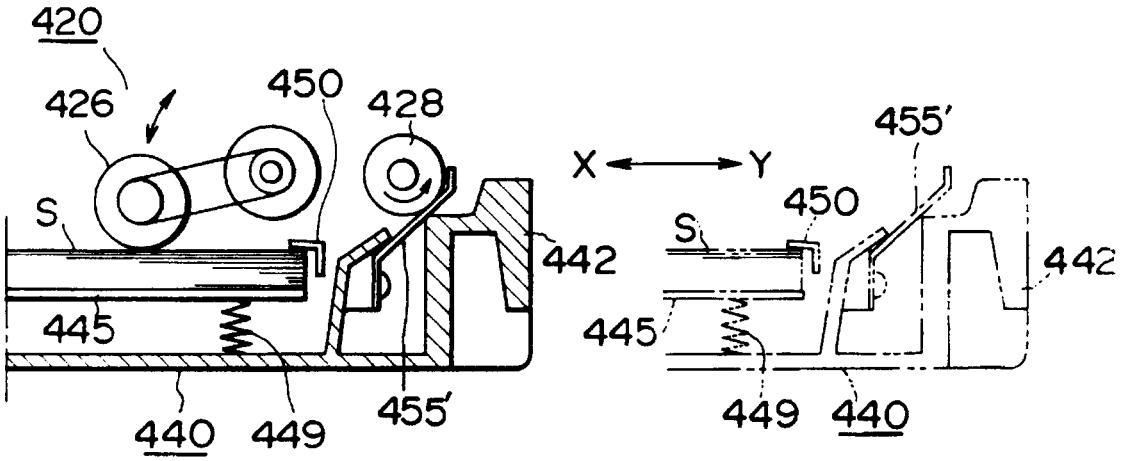
FIG. 14 is a longitudinal sectional view showing a main part of a structure of a convey roller.

(2) FIGS. 13(A) and 13(B)

A sheet feed apparatus A is located at the side of a printer B serving as a main unit.

The sheet feed apparatus A comprises a sheet feeder 320, and a sheet cassette 340 which can be mounted into the feeder 320 or removed therefrom by engaging elongated flanges 344R and 344L of the cassette 340 with guide grooves 332 formed in the feeder 320. The cassette 340 is mounted into a cassette storage space of the feeder 320 or removed therefrom. In this case, the storage space has an upper opening. FIG. 13(A) shows a state wherein the cassette 340 is mounted in the feeder 320, and FIG. 13(B) shows a state wherein the cassette 340 is being mounted in the feeder 320 or removed therefrom. The weight of sheets S in the cassette in a vertical state is received by a sheet trailing end regulating member which is constituted by an inner surface of the rear wall of the cassette.

In the state (FIG. 13(A)) in which the cassette 340 is mounted, sheet feed rollers 326 in the feeder 320 are rotated counterclockwise by one revolution, and one sheet in the cassette 340 on the side of the feed rollers 326 is fed in a direction opposite to the direction X for mounting the cassette 340 in the feeder 320. The sheet is conveyed by a guide 343a and clamped by a nip portion between sheet convey rollers 327 of the feeder 320 and rollers 355 of the cassette 340. The sheet is then fed in the printer B through communication ports 340a and 301a between the feeder 320 and the printer B. The sheet fed in the printer B is guided to an image transfer unit 13 at a photosensitive drum 3 through a guide plate 319a. An image formed on the photosensitive drum 3 is transferred to the sheet. The sheet is then delivered onto a delivery tray 317 through a pair of fixing rollers 15a and 15b.

When the cassette is inserted and mounted in the same direction as the sheet feed direction as in the conventional case, the leading end of the sheet jumps beyond the front end of the cassette upon mounting of the cassette into the feeder due to an inertia, or a strong force acts on the separation pawls to deform the pawls if a separation pawl type cassette is used. In the latter case, smooth movement of the separation pawls cannot be assured. However, when the cassette is inserted and mounted in a direction opposite to the sheet feed direction, the inertia acts in the opposite direction, thus eliminating the above conventional drawback. When the cassette 340 is vertically inserted and mounted in the feeder, rigidity of a sheet trailing end position regulating member 341d which supports the trailing ends of the sheets is increased to prevent misalignment of the trailing ends of the sheets.

(3) FIG. 14

An elastic plate member such as a leaf spring, a molded member, or a Mylar sheet, or a sheet member 455' is used in place of the rollers 55 (first embodiment) which serve as sheet convey members arranged in a cassette 440. When the cassette 440 is sufficiently inserted into a feeder 420, the elastic plate or sheet member 455' which serves as the sheet convey member in the cassette 440 is brought into contact with sheet convey rollers 428 in the feeder 420. One or both of sheet guide members in front of and behind the sheet convey roller may be utilized.

A sheet S fed from the cassette 440 upon rotation of sheet feed rollers 426 of the feeder 420 is introduced into a contact portion between the convey rollers 428 and the elastic sheet member or sheet member 455' and is guided by the member 455'. The sheet S is then conveyed in a substantially vertical direction.

The arrangement of this embodiment is inexpensive, and downstream and upstream guide operations with respect the sheet convey rollers 428 can be assured.

In this case, each convey roller 426 need not be a roller having a sector-shaped section, but can be a roller having a circular section and controlled to be brought into contact with or separated from the sheet S as in this embodiment.

(4) FIGS. 15(A) to 15(E)

Figure 15A:
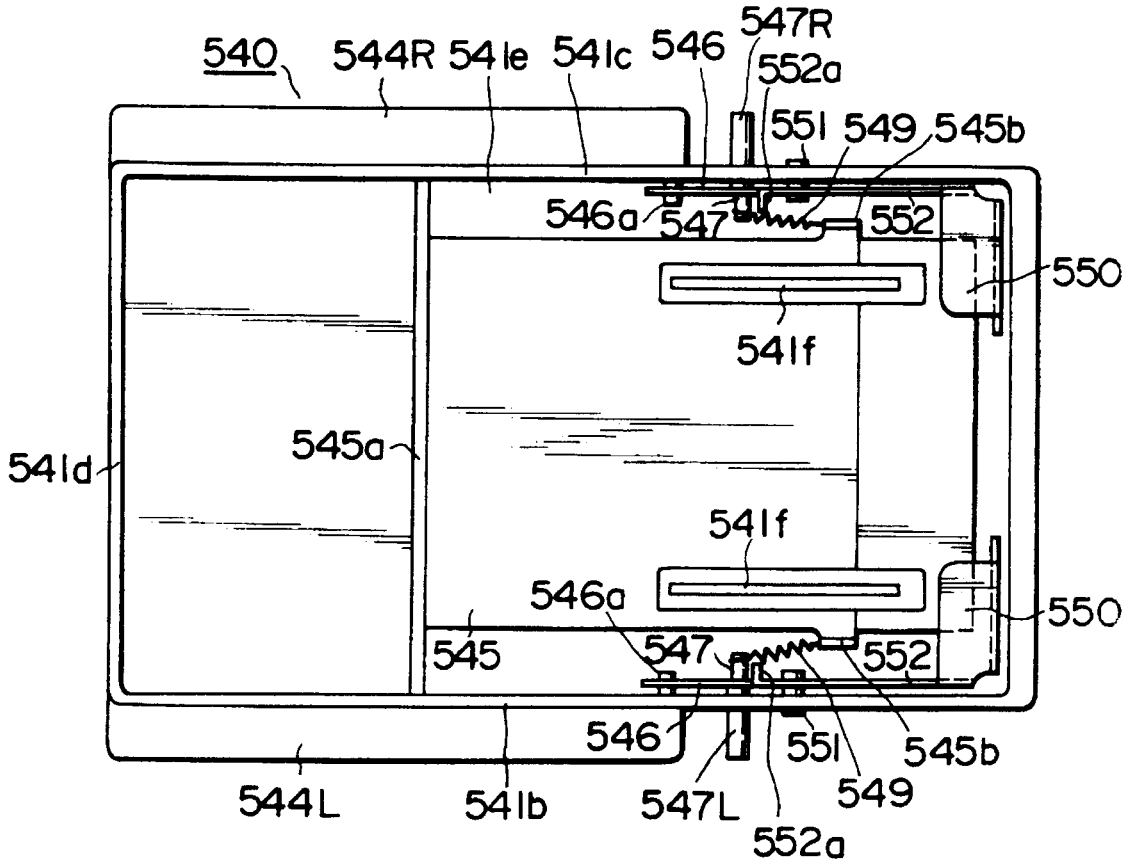
FIGS. 15(A) to 15(D) show another arrangement of a spring member for biasing an intermediate plate upward, in which FIG. 15 (A) is a plan view of a cassette, FIG. 15 (B) is a longitudinal sectional side view of the cassette, FIG. 15
Figure 15B:
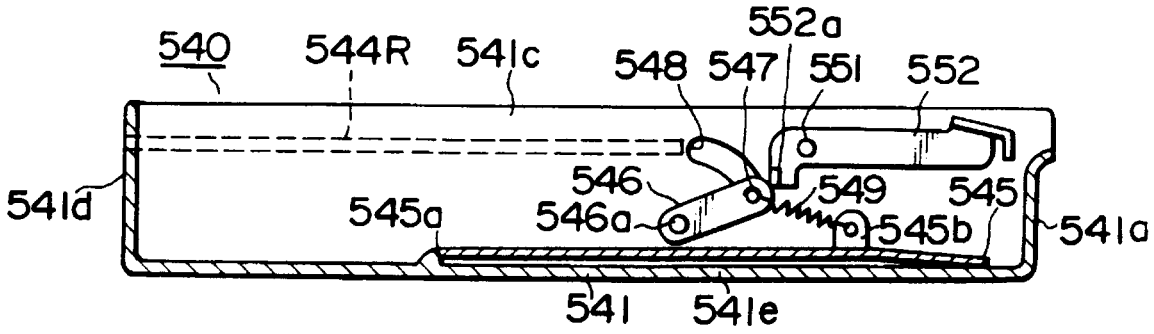
Figure 15C:
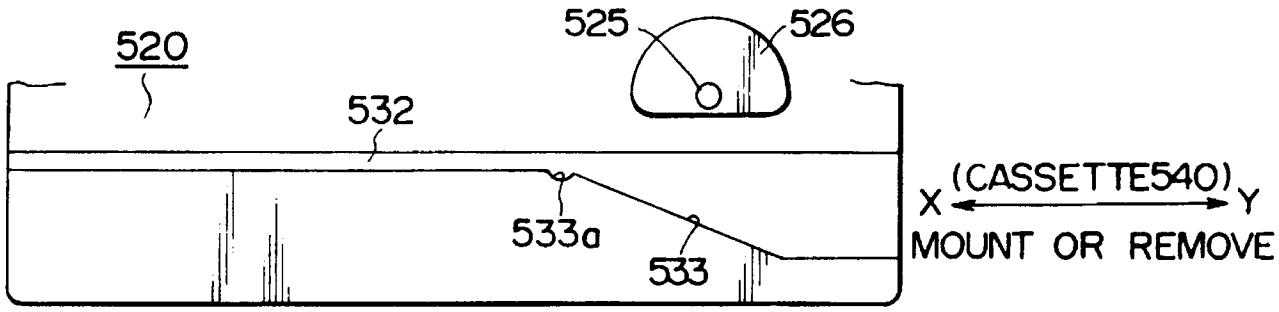

FIGS. 15(A) to 15(E) show still another embodiment of the present invention, in which FIG. 15(A) is a plan view thereof, FIG. 15(B) is a longitudinal side section view, and FIG. 15(C) is a view showing an upward cam surface and a back-and-forth guide groove.

An intermediate plate 545 in a main case 541 of a cassette 540 is vertically pivotal about its rear end 545a. A spring mechanism 545b is arranged at each of the right and left side of the intermediate plate 545. Pressure levers 546 vertically pivotal about shaft 546a are mounted on inner surfaces of right and left side walls 541c and 541b of the main case 541, respectively. Pressure shaft 547 are fixed to distal end portions of the right and left pressure levers 546. Outer end portions (cam followers) 547R and 547L of the pressure shaft 547 are exposed outside the right and left side walls 541c and 541b of the main case 41 through arcuated slots 548 having shafts 546a of the levers 546 as their centers.

One end of each coil spring 549 is hooked to a corresponding one of the spring mechanism 545b of the intermediate plate 545, and the other end of the spring 549 is locked by the corresponding pressure shaft 547 (or pressure lever 546). A pair of right and left sheet separation pawls 550 are mounted on distal end portions of levers 552 vertically pivotal about shafts 551 on the inner surfaces of the right and left side walls 541c and 541b of the case 541. Each separation pawl lever 550 is biased downward (clockwise in FIG. 15(B)) about the shaft 551 by its own weight or a biasing spring (not shown). The pawls 550 are located at the right and left corners of the leading end of the uppermost one of the sheets stacked on the intermediate plate 545.

FIGS. 15(A) and 15(B) show a state wherein the cassette 540 is removed from a feeder 520. In this state, the pressure shafts 547 can be freely moved. For this reason, the intermediate plate 545 is laid on the inner bottom surface of the case 541 by its own weight. The pressure levers 546 are pivoted downward (clockwise in FIG. 15(B)) about the shafts 546a by the laid intermediate plate 545 through the coil springs 549 and the pressure shafts 547. Therefore, the pressure shafts 547 are stopped at the lower end positions of the slots 548. The distal end portions of the pressure levers 546 pivoted downward abut against engaging portions 552a of the separation pawl levers 552. An upward pivotal force (counterclockwise in FIG. 15(B)) about the shafts 551 acts on the separation pawl levers 552. Downward pivotal movement of the separation pawls held at the uppermost positions can be prevented.

A large space is formed between the front end of the intermediate plate 545 and each separation pawl 550, and sheets can be easily stored in the cassette main case. The sides of the sheets stacked on the intermediate plate 545 are regulated by width regulating plates 541f.

Elongated flanges 544R and 544L of the cassette 540 are engaged with corresponding guide grooves 532 formed in the feeder 520 (FIG. 15(C)) to insert the cassette 540 into the feeder 520. The end portions 547R and 547L serving as cam followers on the cassette 540 are engaged with upward cam surfaces 533 formed in the feeder 520 immediately before mounting of the cassette 540 into the feeder 520 is completed. When the cassette 540 is further inserted, the end portions 547R and 547L are moved upward along the arcuated slots 548 toward the upper end positions. When the cassette 540 is inserted in the feeder 520 and is perfectly mounted therein, the end portions 547R and 547L are stabilized in recesses 533a of the cam surfaces 533.

Figure 15D:
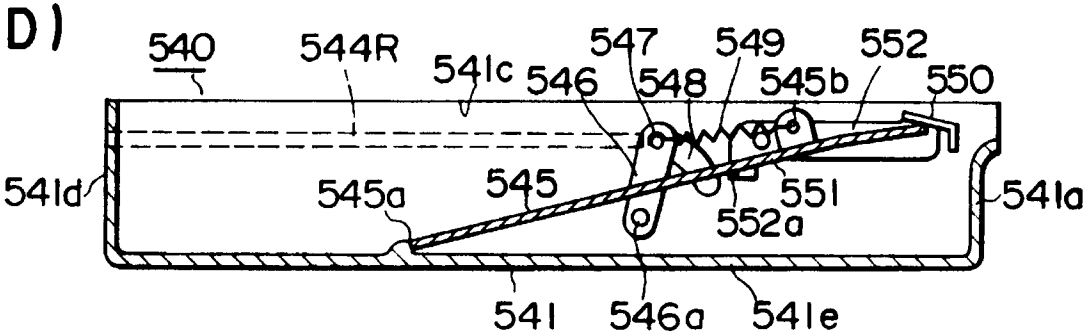

Upon upward movement of the end portions 547R and 547L, the pressure levers 546 are pivoted upward about the shafts 546a. The intermediate plate 545 receives a tensile force through the coil springs 549 and is moved upward at a predetermined pressure. The distal end portions of the pressure levers 546 are separated upward from the engaging portions 552a of the separation pawl levers 552, and the separation pawl lever 552 can be freely pivoted. FIG. 15(D) shows a state wherein the cassette 540 is perfectly mounted in the feeder 520.

When a sufficient space can be assured in the cassette 540 in a direction perpendicular to the sheet feed direction, the springs 549 and the like are arranged in its side areas, and the thickness of the cassette 540 can be minimized. The construction of the sheet feed apparatus A and hence the main unit B can be made compact.

Figure 15E:
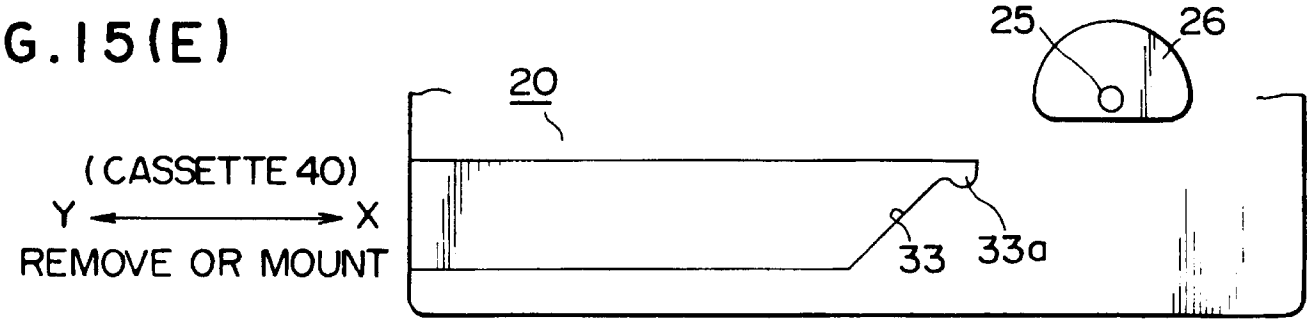
FIG. 15 (E) is a longitudinal sectional side view showing another arrangement of the cassette insertion portion.

As shown in FIG. 15(E), even if the cassette is inserted into the feeder in the same direction as the sheet feed direction as in the conventional case, pressure shafts 547 (547R and 547L) are engaged with or disengaged from cam surfaces 533 directed toward the main unit, thereby performing mounting/removal of the cassette in the same manner as described above.

The cassette includes a means for urging the sheet toward the feed rollers. When the sheet size or the type of sheet is changed, the urging means can be set to correspond to each cassette currently mounted in the main unit, and an optimal feed pressure can advantageously act on the sheet.

The sheet urging means of the cassette also serves as a locking means for locking the cassette when the cassette is perfectly mounted in the feeder as main unit. Therefore, the feeder only has a simple cam mechanism. No locking means need be arranged in the feeder, and a low-cost, compact cassette feeder can be obtained.

What is claimed is:

1. An image forming apparatus including means for feeding a sheet, means for conveying a fed sheet to an image forming section, and means for delivering the sheet processed by the image forming section, comprising:

means for partially supporting said conveying means and said delivering means and having an opening side relative to a housing of said image forming apparatus, *said conveying means and said delivering means being arranged at a side portion of said image forming apparatus*;

sheet storing means for storing therein sheets to be processed; and means for guiding said sheet storing means so that said sheet storing means is detachable from said feeding means at the same side of said image forming apparatus as the opening side of said supporting means, wherein said feeding means feeds the sheet in a direction opposite to a direction for mounting said sheet storing means.

2. An apparatus according to claim 1, wherein part of said sheet conveying means also serves as another feeding means for feeding the sheet.

3. An apparatus according to claim 2, wherein said sheet conveying means comprises a roller which opposes another roller at a convey section thereof and a frictional member at a feed section thereof.

4. An apparatus according to claim 3, further including a sheet path for guiding a sheet separated by said frictional member to said convey section, said sheet path being located in a downstream side of said feed section.

5. An apparatus according to claim 4, further including a sheet delivery tray in an upstream side of said feed section.

6. An apparatus according to claim 5, wherein said feeding means and said guiding means are constituted by a unit structure with respect to a housing of said image forming apparatus.

7. A sheet feed apparatus used in an image forming apparatus including means for conveying a sheet fed by feeding means to an image forming section, and means for delivering the sheet processed by said image forming section, comprising:

a sheet feed unit as a single unit comprising said feeding means and means for guiding sheet storing means; and sheet storing means comprising means for stacking the sheets and means for conveying the sheet, said conveying means being located in a downstream side of said stacking means, and said sheet storing means being detachable from said sheet feed unit.

8. An apparatus according to claim 7, wherein said feeding means feeds the sheet in a direction opposite to a direction for mounting said sheet storing means.

9. An apparatus according to claim 8, wherein said conveying means guides the sheet to said image forming apparatus housing through an opening formed in a bottom portion of a housing of said image forming apparatus.

10. An apparatus according to claim 7, further including spring means for biasing said stacking means toward said feeding means, and means for biasing said spring means upon mounting of said sheet storing means in said sheet feed unit.

11. An apparatus according to claim 10, wherein said sheet feed unit comprises a cam surface, said sheet storing means comprises a cam follower which is engaged with said cam surface of said sheet feed unit when said sheet storing means is mounted in said sheet feed unit, and said spring means for biasing said stacking means upward has one end coupled to said cam follower and the other end coupled to said stacking means through a transmission member, so that said stacking means is moved vertically upward through said transmission member by a charged force of said spring means which is obtained by engagement of said cam follower with said cam surface when said sheet storing means is mounted in said sheet feed unit.

12. An apparatus according to claim 11, wherein said sheet storing means comprises a one-sheet separation pawl engaged with a leading end of an uppermost one of the sheets, said one-sheet separation pawl being provided with an engaging portion interlocked with said cam follower, and said stacking means is located in a lowermost position by its own weight when said sheet storing means is not mounted in said sheet feed unit so that said one-sheet separation pawl is moved upward to an uppermost position from said stacking means through said transmission member, said spring member, and said cam follower.

13. An apparatus according to claim 7, wherein a maximum distance $l_1$ for inserting said sheet storing means into said sheet feed unit is larger than a size $l_2$ of said sheet feed unit in a direction for inserting said sheet storing means into said sheet feed unit, and a front surface of said sheet storing means is substantially aligned with a front surface of a housing of said image forming apparatus when said sheet storing means is perfectly inserted and normally mounted into said sheet feed unit.

14. An apparatus according to claim 7, wherein the sheet fed from said sheet storing means by said feeding means of said sheet feed unit is conveyed in a direction substantially perpendicular to the sheet stored in said sheet storing means.

*15. An image forming apparatus including sheet feeding means for feeding the sheet and transporting means for transporting the sheet fed by said sheet feeding means through an image forming section to an outlet section, comprising:*

*means for partially supporting said transporting means, said supporting means having an opening side relative to a housing of said image forming apparatus, said transporting means being arranged at a side portion of said image forming apparatus;*

*sheet storing means for storing therein sheets to be processed; and*

*means for guiding said sheet storing means so that said sheet storing means is detachable from said feeding means at the same side of said image forming apparatus as the opening side of said supporting means,*

*wherein said feeding means feeds the sheet in a direction opposite to a direction for mounting said sheet storing means.*

*16. An image forming apparatus according to claim 15, wherein said supporting means is pivoted at a side portion of said image forming apparatus, and said transporting means is arranged to transport the sheet in a direction substantially perpendicular to the direction for mounting said sheet storing means.*

*17. An image forming apparatus according to claim 15, wherein said transporting means comprises means for conveying the fed sheet to said image forming section, image forming means, means for delivering the sheet processed at said image forming section to said outlet section, and guide means for guiding the fed sheet and the processed sheet.*

*18. An apparatus according to claim 17, wherein part of said sheet conveying means also serves as another feeding means for feeding the sheet.*

*19. An apparatus according to claim 18, wherein said sheet conveying means comprises a roller which opposes another roller at a conveying section thereof and a frictional member at a feeding section thereof.*

*20. An apparatus according to claim 19, further comprising a sheet path for guiding a sheet separated by said frictional member to said conveying section, said sheet path being located in a downstream side of said feeding section.*

*21. An apparatus according to claim 20, further comprising a sheet delivery tray in an upstream side of said feeding section.*

*22. An apparatus according to claim 21, wherein said feeding means and said guiding means for said sheet storing means are constituted by a unit structure with respect to a housing of said image forming apparatus.*

* * * * *

UNITED STATES PATENT AND TRADEMARK OFFICE

CERTIFICATE OF CORRECTION

PATENT NO. : Re. 35,341

DATED : October 1, 1996

INVENTOR(S) : YUTAKA KIKUCHI, ET AL.

It is certified that error appears in the above-indentified patent and that said Letters Patent is hereby corrected as shown below:

Title page, item [56]"198529 4/1989 Japan" should read --1-98529 4/1989 Japan--.

Column 2,
line 34, "rollers 110." should read --rollers 119.--.

Column 3,
line 13, "upermost" should read --uppermost--;
line 28, "th" should read --the--;
line 31, "the sheet" should read --The sheet--; and
line 44, "od" should read --of--.

Column 5,
line 15, "size $1_2$" should read --size $\ell_2$--.

Column 6,
line 12, "thr" should read --the--.

Column 7,
line 1, "section" should read --sectional--; and
line 43, "the" should read --The--.

Column 8,
line 20, "printer" should read --printer housing--.

Column 10,
line 14, "tat" should read --that--.

Column 11,
line 35, "srves" should read --serves--.

UNITED STATES PATENT AND TRADEMARK OFFICE

CERTIFICATE OF CORRECTION

PATENT NO. : Re. 35,341

DATED : October 1, 1996

INVENTOR(S) : YUTAKA KIKUCHI, ET AL.

It is certified that error appears in the above-indentified patent and that said Letters Patent is hereby corrected as shown below:

Column 12,
line 25, "therewithy." should read --therewith.--.
Column 14,
line 52, "ar" should read --are--.
Column 21,
line 59, "unit" should read --unit,--.

Signed and Sealed this

Twentieth Day of May, 1997

*Attest:*

*Attesting Officer*

BRUCE LEHMAN

*Commissioner of Patents and Trademarks*